US012639702B2

(12) United States Patent
Helms et al.

(10) Patent No.: US 12,639,702 B2
(45) Date of Patent: May 26, 2026

(54) SECURE TOKEN EXCHANGE AND CONTROLS AND INTERFACES THEREFOR

(71) Applicant: The Clearing House Payments Company L.L.C., New York, NY (US)

(72) Inventors: Jarrett Bradley Helms, Kernersville, NC (US); Brice Richard Ackerman, Bahama, NC (US); Jeffrey Charles Williams, Winston-Salem, NC (US)

(73) Assignee: The Clearing House Payments Company L.L.C., New York, NY (US)

( * ) Notice: Subject to any disclaimer, the term of this patent is extended or adjusted under 35 U.S.C. 154(b) by 118 days.

(21) Appl. No.: 18/192,507

(22) Filed: Mar. 29, 2023

(65) Prior Publication Data

US 2024/0330912 A1     Oct. 3, 2024

(51) Int. Cl.
 G06Q 20/38          (2012.01)

(52) U.S. Cl.
 CPC ................................ G06Q 20/3825 (2013.01)

(58) Field of Classification Search
None
See application file for complete search history.

(56) References Cited

U.S. PATENT DOCUMENTS

| | | | | |
|---|---|---|---|---|
| 6,173,272 B1 * | 1/2001 | Thomas | ............... | G06Q 20/385 |
| | | | | 705/42 |
| 6,317,745 B1 * | 11/2001 | Thomas | ................. | G06Q 20/14 |
| | | | | 705/40 |
| 7,103,577 B2 * | 9/2006 | Blair | .................... | G06Q 20/401 |
| | | | | 705/26.1 |
| 8,447,983 B1 * | 5/2013 | Beck | ...................... | H04L 9/0894 |
| | | | | 713/172 |
| 8,631,238 B2 * | 1/2014 | Chang | ................... | H04L 63/068 |
| | | | | 713/168 |
| 9,223,583 B2 * | 12/2015 | Chang | ................... | H04L 63/068 |
| 9,424,574 B2 * | 8/2016 | Bondesen | .......... | G06Q 20/3821 |
| 9,846,878 B2 * | 12/2017 | Kumnick | ........... | G06Q 20/4016 |
| 9,942,217 B2 * | 4/2018 | Gulledge | ............ | H04L 63/0807 |
| 10,380,583 B1 * | 8/2019 | Ellis | ..................... | G06Q 20/382 |

(Continued)

FOREIGN PATENT DOCUMENTS

| | | | | | | |
|---|---|---|---|---|---|---|
| JP | 2019106212 A | * | 6/2019 | ............. | G06Q 20/20 |
| JP | 2020173830 A | * | 10/2020 | ............. | G06Q 20/02 |
| WO | WO-2005033853 A2 | * | 4/2005 | ............. | G06Q 20/02 |

OTHER PUBLICATIONS

Fiserv. "Payments Exchange: RTP." (Jun. 16, 2021). Retrieved online Feb. 4, 2025. https://www.fiserv.com/content/dam/fiserv-ent/final-files/marketing-collateral/brochures/Payments_Exchange_RTP_Brochure_0521.pdf (Year: 2021).*

(Continued)

*Primary Examiner* — James A Reagan
(74) *Attorney, Agent, or Firm* — Merchant & Gould P.C.

(57)               ABSTRACT

Methods, systems, and computer program products provide direct and in-network provisioning of tokens. A secure token exchange (STE) processor receives a direct token request from a token requestor prior to sending a payment transaction message or request for payment message. In-network token provisioning is performed during a transaction and also involves the STE processor. Data aggregation security is provided by verifying consumer information, tokenizing account data, and forwarding a token and consumer data to a data aggregator.

24 Claims, 6 Drawing Sheets

(56) References Cited

U.S. PATENT DOCUMENTS

| | | | | |
|---|---|---|---|---|
| 10,387,879 | B2 * | 8/2019 | Thomas | G06Q 20/4012 |
| 10,643,203 | B2 * | 5/2020 | Furche | H04L 9/0891 |
| 10,990,967 | B2 * | 4/2021 | Wang | G06Q 20/385 |
| 11,042,882 | B2 * | 6/2021 | Ledford | G06Q 20/407 |
| 11,127,016 | B2 * | 9/2021 | Narayan | H04L 9/3234 |
| 11,429,975 | B1 * | 8/2022 | Asefi | G06F 21/62 |
| 11,436,577 | B2 * | 9/2022 | Davey | G06Q 20/108 |
| 2009/0240620 | A1 * | 9/2009 | Kendrick | G06Q 20/40 |
| | | | | 705/39 |
| 2012/0159140 | A1 * | 6/2012 | Chang | G06F 9/4401 |
| | | | | 713/2 |
| 2012/0159162 | A1 * | 6/2012 | Chang | H04L 63/068 |
| | | | | 713/168 |
| 2013/0212024 | A1 * | 8/2013 | Mattsson | G06Q 20/382 |
| | | | | 705/64 |
| 2015/0032627 | A1 * | 1/2015 | Dill | G06Q 20/385 |
| | | | | 705/44 |
| 2015/0112870 | A1 * | 4/2015 | Nagasundaram | G06Q 20/3821 |
| | | | | 705/67 |
| 2015/0142673 | A1 * | 5/2015 | Nelsen | G06Q 20/405 |
| | | | | 705/76 |
| 2015/0161596 | A1 * | 6/2015 | McCarthy | G06Q 20/02 |
| | | | | 705/67 |
| 2015/0199689 | A1 * | 7/2015 | Kumnick | G06Q 20/3674 |
| | | | | 705/67 |
| 2015/0254656 | A1 * | 9/2015 | Bondesen | G06Q 20/36 |
| | | | | 705/41 |
| 2015/0312038 | A1 * | 10/2015 | Palanisamy | G06Q 20/385 |
| | | | | 713/155 |
| 2016/0359829 | A1 * | 12/2016 | Gulledge | H04L 63/0807 |
| 2017/0091758 | A1 * | 3/2017 | Kim | G06Q 20/227 |
| 2017/0293912 | A1 * | 10/2017 | Furche | H04L 9/0894 |
| 2017/0357965 | A1 * | 12/2017 | Knopp | G06Q 20/385 |
| 2018/0174138 | A1 * | 6/2018 | Subbarayan | G06Q 20/385 |
| 2018/0204211 | A1 * | 7/2018 | Douglas | G06Q 20/385 |
| 2019/0340590 | A1 * | 11/2019 | Davey | G06Q 20/108 |
| 2020/0097928 | A1 * | 3/2020 | Dresner | G06Q 20/023 |
| 2020/0265426 | A1 * | 8/2020 | Furche | G06Q 20/3825 |
| 2020/0302442 | A1 * | 9/2020 | Hosp | G06Q 20/3678 |
| 2020/0320515 | A1 * | 10/2020 | Basu | G06Q 20/3674 |
| 2021/0042830 | A1 * | 2/2021 | Burke | G06Q 20/341 |
| 2021/0192487 | A1 * | 6/2021 | Mendlowitz | G06Q 20/401 |
| 2021/0320922 | A1 * | 10/2021 | Furhmann | G06Q 20/385 |
| 2023/0067507 | A1 * | 3/2023 | Seton | G06Q 20/4014 |
| 2023/0214829 | A1 * | 7/2023 | Braundmeier | G06Q 20/385 |
| | | | | 705/39 |
| 2023/0267458 | A1 * | 8/2023 | Furche | H04L 9/3263 |
| | | | | 705/69 |
| 2024/0305628 | A1 * | 9/2024 | Drechsler | G06Q 20/385 |
| 2024/0330912 | A1 * | 10/2024 | Helms | G06Q 20/3825 |

OTHER PUBLICATIONS

Token Alliance. "Understanding Digital Tokens." (Aug. 31, 2018). Retrieved online Feb. 4, 2025. https://lowellmilkeninstitute.law.ucla.edu/wp-content/uploads/2018/08/Understanding-Digital-Tokens.pdf (Year: 2018).*

Bank for International Settlements. "Wholesale digital tokens." (Dec. 2019). Retrieved online Feb. 4, 2025. https://www.bis.org/cpmi/publ/d190.pdf (Year: 2019).*

* cited by examiner

SECURE TOKEN EXCHANGE AND CONTROLS AND INTERFACES THEREFOR

FIELD

Example aspects of the present invention generally relate to secure network transactions, and more particularly to systems, methods and computer products for providing controlled, secure tokens that can be utilized across different payment networks, different financial institutions, gateways, and customers of the financial institutions.

BACKGROUND

Security of information is important in computer technology. It is critical that data being sent from a sender to a recipient is unable to be intercepted and understood by an intermediate source. Cybercriminals are constantly improving their attacks to illegally obtain confidential information such as account credentials. As a result, security-related challenges are difficult to solve and constantly evolving.

Tokens can be used to hide account numbers by replacing the actual account number with a unique, randomized token. This can help protect sensitive information and reduce the risk of data breaches. For example, when a user enters their account number into a website or application, the server generates a token that represents the account number. This token is then stored on the user's device as a cookie or a local storage item. Whenever the user needs to access their account, the token is sent along with the request instead of the actual account number.

The server receiving the request then uses the token to retrieve the actual account number from its database. The user is granted access to their account, without the actual account number being transmitted over the internet.

By using tokens, the actual account number is hidden and only a unique token is used to represent the account number. This helps to reduce the risk of unauthorized parties intercepting the account number and accessing sensitive information.

While tokens can be useful in protecting sensitive information, they are not foolproof and can still be compromised. It is essential to use other security measures such as encryption and access controls to protect account information.

One of the biggest challenges in implementing tokenization in the banking industry is integrating the technology into existing systems and processes. Banks need to ensure that their tokenization systems can work seamlessly with their existing payment processing systems and that they can integrate with other third-party systems, and fraud detection tools.

A demand deposit account (DDA) is a type of financial institution account that offers access to funds without requiring advance notice. In other words, money can be withdrawn from a DDA on demand and as needed. These accounts are useful for managing everyday spending, paying bills, withdrawing cash, and the like. Checking accounts and savings accounts are common types of DDAs.

There is currently no standard for tokenization for DDA, which can make it difficult for banks to work with each other and with third-party payment processors, and even more technically challenging to operate across different payment networks.

A payment network (sometimes referred to as a financial transfer network) is a system that facilitates the transfer of funds from one account to another, typically across different financial institutions or banks. These networks are used for a variety of purposes, such as wire transfers, direct deposits, and bill payments. Payment networks can be domestic or international in scope, and they typically involve the transfer of money between individuals, businesses, or financial institutions.

Financial Institutions that hold DDAs can access certain payment capabilities via banking technology involving payment networks. One such payment network is referred to as a real-time payment network. Real-time payments, as used herein, are payments that are initiated, cleared and settled nearly instantaneously (e.g., within seconds). A real-time payment network (also referred to as a real-time payments platform) generally refers to a network through which real-time payments are made. The RTP® network is a real-time payment network in the United States provided by The Clearing House. The RTP® network is accessible to certain financial institutions that hold DDAs. In the art, a real-time payment message is referred to as an RTP message. RTP in this context should not be confused with the registered trademark RTP®.

The automated clearinghouse (ACH) system, referred to herein simply as the ACH network, is a network through which depository institutions send each other batches of electronic credit and debit transfers. The direct deposit of payroll, social security benefits, and tax refunds are typical examples of ACH credit transfers. The direct debiting of mortgages and utility bills are typical examples of ACH debit transfers. While the ACH network was originally used to process mostly recurring payments, the network is today being used extensively to process one-time debit transfers, such as converted check payments and payments made over the telephone and Internet.

The Electronic Payment network (EPN) is an ACH system operated by The Clearing House that operates as a computerized electronic funds transfer system for processing both individual consumer and commercial financial transactions. The EPN and the Federal Reserve System are two national ACH platforms capable of performing ACH transactions.

As an ACH operator, the Reserve Banks (i.e., the regional banks of the Federal Reserve System), and EPN receive files of ACH payments from originating depository financial institutions, edit and sort the payments, deliver the payments to receiving depository financial institutions, and settle the payments by crediting and debiting the depository financial institutions' settlement accounts. The Federal Reserve System and EPN rely on each other to process interoperator ACH payments—that is, payments in which the originating depository financial institution (ODFI) and the receiving depository financial institution (RDFI) are served by different operators. These interoperator payments are typically settled by the so-called Reserve Bank Systems.

From a technology perspective, the RTP® network is significantly different from the ACH network. RTP® network payments clear and settle individually in real-time with immediate finality. Same day ACH payments are processed in batches and settle after the payments clear. The RTP® network and ACH network are also built upon different infrastructures having their own protocols. A transaction that cannot be processed over the RTP® network, for example, might be able to be processed over the ACH network.

One technical limitation of the existing payment networks such as the RTP® network and the ACH network is that they do not provide the same controls over tokens. That is, the same token controls that can be performed on the RTP® network cannot be performed on the ACH network. One technical issue is that the ACH network does not have access to the same amount of information as the RTP® network. One reason for this is that the ACH network protocol communicates fewer fields of data.

Tokenization has been used in the banking industry to reduce exposure of account credentials. U.S. Pat. Nos. 6,173,272, 6,317,745, and 10,387,879 to Thomas et al, and U.S. Pat. No. 11,042,882, to Ledford et al., relate to electronic payment transactions. These patents are hereby incorporated by reference in their entireties, as if set forth fully herein.

As explained in U.S. Pat. Nos. 6,173,272, 6,317,745, and 11,042,882, as an alternative to traditional payment transactions, an ACH network can be configured to enable a biller (an entity or company such as a merchant or vendor that issues bills and accepts payments in exchange for goods or services) to use a bank account number pseudo-code (BANPC) and a bank routing number pseudo-code (BRNPC) for an added level of security. A BANPC is an account identifier alias for a biller's account number at its biller FI. A BRNPC is an alias for a biller financial institution's (FI's) routing number which indicates to the ACH network that a BANPC transaction is present. Each alias also is referred to as a token. For a BANPC transaction, when an electronic payment is specified to be made by a consumer by way of its FI instead of using the biller's actual account number and a biller FI's actual routing number, a BANPC identifier corresponding to that account number and a BRNPC are obtained and inserted by the FI system in the payment transaction message. As such, "tokenization" is thereby performed. For security, FI systems are provided with BRNPCs and corresponding BANPCs, but not with the biller's actual account and routing numbers. The BANPC and BRNPC collectively protect the biller's banking information and mitigate the opportunity for fraud.

U.S. Pat. No. 11,042,882 explains that tokenization can be provided dynamically or statically. A dynamic token is a token that is unique for a particular transaction rendering the token itself unusable for any other transaction. A static token can, however, be used for multiple transactions but restricted to prevent further unauthorized use (e.g., credit only, single merchant). Tokens can be further limited to use for a certain digital wallet, merchant, channel (e.g., e-commerce), amount, transaction type (e.g., credit or debit) or expiration date. A token vault or bank (or multi-bank) vault creates tokens, performs customer authentication, and provisions tokens to digital wallets or directories.

U.S. Pat. No. 10,387,879 describes a system that uses a payment identification code for electronic payments between business buyers and sellers. To employ the concept, banks are issued a unique payment identifier code (UPIC) number for each business customer demand deposit account (DDA). As part of the issuance process, a trusted third party, such as a clearing house, for example The Clearing House, links sensitive information related to the seller and its individual DDA to the issued UPIC number. Such a trusted third party provides a system that maintains and distributes UPIC numbers for all that wish to use them. As a result, confidential account relationship information is masked to outside parties. Individual sellers communicate their UPIC numbers to buyers who are then capable of originating payments using the UPIC number. Upon receipt of a payment instruction containing a valid seller UPIC number, a payment network can then access the UPIC database to retrieve associated account information required to execute the payment.

The above-described token architectures, while serving to secure account information, are limited in some respects.

Initially, no technology currently exists that allows billers to seamlessly use a single token for performing transactions across different payment networks such as across the ACH network and the RTP® network. This is due to the inherent technical incompatibilities of the ACH network and RTP® network as mentioned above.

A biller system integrates with one or more payment networks such as the ACH network or the RTP® network by using electronic payment processing and settlement systems to transfer funds between bank accounts. Unlike the ACH network, which supports "push" and "pull" transactions, the RTP® network currently only supports push transactions (also referred to as a "credit push transaction"). Thus, a biller system cannot debit or "pull" from another account via the RTP® network. There is an option for the biller system to provide a "request for payment" instruction, but it is up to the payor (e.g., an entity, such as a person, or another company) to initiate a push payment to the requesting biller system (referred to simply as a requestor) or provide authorization for the biller to do so on behalf of the payor. While credit push transactions are seen to reduce certain types of fraud risk, they are limited with respect to the types of applications they can be used.

Autopay options are popular for customers who would prefer billers to debit their financial institution (FI) accounts or charges on their credit card periodically for the services they provide. The infrastructure that enables this service is referred to as a debit authorization system. A debit authorization system enables a consumer to give the biller, in the context of an autopay service also referred to as an "originator", permission to initiate a debit entry to their account. Before the originator can begin collecting debit payments, however, they must receive debit authorization information from the account holder. Once the debit authorization is complete, an originator sends a debit request through the payment network. This is typically only performed by payment networks that can perform debit (i.e., "pull") authorizations, such as ACH debit authorizations. Due to compatibility, interoperability, control and/or data privacy reasons, use cases for such transactions are limited.

Billers, disbursers, and other entities that hold credential information for payment accounts (e.g., DDAs) on file store a single instance of a real account (e.g., the original DDA authentication information). Most billers do not have a place in their databases for storing information for multiple accounts or the ability to store network eligibility or acceptance. And even those that do cannot use a single token on both the RTP® network and the ACH network. Indeed, using the same token would have a negative impact, particularly if a transaction is rejected because the token is not accepted on one payment network or the other. For example, should a customer need to pay an originator by a certain date and their ACH debit authorization has suffered a technical issue, the customer may need to switch to a different payment network to effect a payment. The customer, for example, may need to switch from using the ACH network's pull architecture to a different payment network, such as the RTP® network in order to "push" the payment to the originator. It would be useful therefore to enable token interoperability between the tokens used in a real-time payment network such as the RTP® network and the tokens used in an ACH network so as to minimize customer interactions and the need for more complex infrastructure. It would also be useful to enable the benefits of tokenization for originators that do not have an infrastructure for tokenizing the accounts of its customers. It would further be useful to have a technology that enables financial institution (FI) systems communicatively coupled to the payment networks to generate graphical user interface (GUI) that enables token controls for themselves and their customers (both consumer payors and businesses, e.g., payees or billers), particularly keyed off a single token.

As used herein an FI system is sometimes referred to for convenience simply as an FI.

Referring again to DDAs, DDA credentials for business or consumer savings and/or checking accounts are typically stored in a wide range of locations. E-commerce websites, invoice, payroll, and mobile wallet platforms typically store account numbers in their raw form, making them vulnerable to fraud. Vendors would, for security reasons, like to swap DDA credentials in their databases for tokens. Doing so is currently not possible because if a token is created that doesn't follow the same structure (e.g., a routing transit number (RT)/account number structure), then the vendor would be bound to have the bank that issued the token detokenize it prior to a transaction. That means the vendor must use the one bank that can perform that detokenization before the payment is actually sent to the payment network.

A routing number is a code (e.g., a nine-digit code) used by financial institutions to identify other financial institutions. It is also known as an RTN (routing transit number) and an ABA (American Bankers Association) routing number. Combined with an account number, it allows certain institutions that use this structure to locate a particular account. As explained above, the only mechanisms available for tokenizing such credentials involve significant infrastructure by the associated financial institution that owns its own accounts. And even with such an infrastructure, the tokens utilized by one financial institution cannot necessarily be utilized by another financial institution. As such the use of tokens for authentication and security purposes currently is fractionalized.

There is a need, therefore, to enable token interoperability between across different payment networks, financial institution systems, and the customers of the financial institution systems (e.g., entities or companies). That is, there is a need for a centralized tokenization system that is interoperable across different payment networks (e.g., RTP® network and the ACH network), and across different FI systems. There is also a need for a token architecture that relies on a demand for tokens from entities that hold accounts-on-file and a supply of tokens from account-holding banks.

Data management services enable users to allow a data management system to obtain user data, such as log-in credentials associated with the user, from a third-party site computing system. The data management system provider computing system can then be used to pretend to be the user by using the provided log-in credentials to access the user's data. In some cases, the data is accessed directly and in other cases the data is obtained via screen scraping or a similar technology. In addition to using significant bandwidth of financial institution and merchant networks and website servers, there is a concern that too much data is being scraped from the third-party target sites. In some implementations, each time a user connects to their FI through a data management service, a unique token will be generated. This token, referred to as an "access token" can be used as a login at the FI system via an application programming interface (API). For example, the access token will be passed to, for example, an application client of a user to provide access to an account at the financial institution. However, with some data management services, if a fraudster obtains access to the user's access token, the fraudster could use that access token to gain access to the user's account. As such, security and control mechanisms for securing and controlling tokens would be useful.

SUMMARY

In some embodiments, there are provided systems and methods for direct secure token provisioning and tokenizing account information. In one embodiment, the direct secure token provisioning system includes a secure token exchange processor that communicates with various computing systems and an account holding system. The STE processor is configured to receive a direct token request from a token requestor prior to the token requestor sending a payment transaction message or a request for payment message, and the STE vault stores rules and information associated with the account. The tokenizing account information system includes a first computing system that communicates a token request communication message to an STE processor. The STE processor obtains a token that includes tokenized real account information formatted for use in a payment transaction and communicates a tokenized electronic communication message to the first computing system without including the real account information of the account. Both systems are also described in corresponding methods, which include receiving a direct request for a token or a token request communication message, obtaining a token that includes tokenized real account information, and communicating a tokenized electronic communication message. The real account information of the account can reside in either the account holding system or the first computing system.

In some embodiments, there are provided systems and methods for tokenization of account information for use in payment transactions. In an example embodiment, a system includes a sponsor computing system that communicates a request message including account information to a secure token exchange (STE) processor. The STE processor generates a token that includes tokenized account information formatted for use in a payment transaction and communicates the token to the sponsor computing system without including the real account information. A first computing system receives the tokenized account information from the sponsor computing system for use in a payment transaction. The token is effective across different payment networks and different financial institutions. The method involves receiving a request message, generating a token, communicating the token to the sponsor computing system without including the real account information, and forwarding the tokenized electronic communication message to a first computing system without including the real account information. The real account information may reside in the sponsor computing system, the first computing system, or an account holding system for a predetermined amount of time prior to tokenization.

In some embodiments, there are provided systems and methods for tokenizing account information to enhance the security and privacy of payment transactions. In an example embodiment, a system includes a secure token exchange (STE) processor that receives a request from an account holding system to tokenize real account information. The STE processor tokenizes the information and generates a token, which is sent back to the account holding system in a tokenized electronic communication message that excludes the real account information. The system also includes the capability to generate a tokenization notification message that includes the token and additional information regarding the status of the token. The account holding system stores the token for use in payment transactions across different payment networks and financial institutions.

The corresponding method involves receiving the token request communication message, tokenizing the real account information, generating a token, and sending the tokenized electronic communication message back to the account holding system. The method also includes generating a tokenization notification message that includes the token and additional information regarding the status of the token, storing the token in the account holding system for use in payment transactions, and generating the TOK NOTIFICA-TION MSG in response to a request for tokenized account information. The token generated by the STE processor is effective across different payment networks and financial institutions.

In some embodiments, there are provided systems and methods for in-network token provisioning during a trans-action, which involves receiving a payment transaction message with a payment token request code, sending a tokenization request message to a STE processor, generating a token and returning a tokenization response message to the payment network with the token information, receiving a payment transaction message from a sponsor computing system with the token, and sending the payment transaction message to a first computing system.

In an example embodiment, the system includes a pay-ment network, an account holding system, a STE processor, a sponsor computing system, and a first computing system. In-network provisioning can be performed as a result of a request for payment (RfP) and by an RTP® network creating the token as part of an RTP® network transaction flow. The RTP® network can receive a real-time payment message with an in-network provisioning flag and make a call to the STE processor to provision a token or to look up a previ-ously provisioned token. The real-time payment message can be tokenized by replacing a participant's RTN and the sender's account number with the participant's token RTN and a token, thereby masking the participant's account information in the outbound real-time payment message to another participant. Corresponding methods are also described.

In some embodiments, there are provided systems and methods for providing tokenized credit transfer in a real-time payments (RTP®) network. The system includes a first computing system, a sponsor computing system, a payment network, an STE processor, and an account holding system. The first computing system communicates a first payment transaction message containing a token to the sponsor com-puting system. The sponsor computing system forwards the message to the payment network, which detects the token and sends a detokenization request message to the STE processor. The STE processor retrieves the real account information from an STE vault by mapping the token to the information stored in the STE vault and sends a detokeni-zation response message to the payment network. The payment network then sends a second payment transaction message containing real account information to the account holding system.

In one embodiment, the payment network detects the token by detecting a tokenized routing transit number in the message packet. In some embodiments, the STE processor retrieves real account information by using a unique iden-tifier to find a first table that contains the record, obtaining a surrogate key for the record, and using the surrogate key to find corresponding second tables that contain additional details about the record. The STE vault, in some embodi-ments, stores real account information in second tables, each containing a subset of data, and joins these tables using a link table to retrieve the complete record. Corresponding methods are described as well.

In some embodiments, systems and methods provide tokenized credit or debit transfer in an ACH network. The system includes a first computing system configured to communicate a first payment transaction message contain-ing a token to be detokenized, a sponsor computing system, a payment network, an STE processor, and an account holding system. The payment network receives the PT MSG-1 message containing a token and communicates a detokenization request message to the STE processor to retrieve real account information. The STE processor uses the DETOK REQ. MSG-1 to retrieve the real account information and returns a detokenization response message to the payment network. The account holding system receives a second payment transaction message that includes real account information from the payment network to effect the ACH transaction. The system may also periodically store mappings of real account information and tokens in a table in the STE vault and retrieve the table periodically to push updates to the payment network. The system may further generate mappings of real account information and tokens and pull the table by the STE processor when needed. The payment network or the STE processor may perform a validation operation to determine whether a credit transac-tion or debit transaction is permitted for a particular account, and the determination is performed against the token.

In some embodiments, systems and methods provide requests for payment (RfP) and subsequent credit transfers. The system comprises a first computing system configured to issue a first RfP message containing a token, a sponsor computing system configured to forward the first RfP mes-sage to a payment network, and a payment network config-ured to issue a detokenization request to a secure token exchange (STE) processor to retrieve detokenized data cor-responding to an account associated with the RfP message, and to transmit a second RfP message including the deto-kenized account information and any additional payment information necessary to effect payment. An account hold-ing system is configured to execute the credit transfer upon receiving the second RfP message. The payment network is further configured to communicate the real account infor-mation in a payment transaction message to the STE pro-cessor to retokenize the token and to forward a second payment transaction message including the retokenized information to the first computing system.

Some embodiments describe systems and methods for enhanced data aggregation security. The system comprises a data aggregator, a data access network, an STE processor including an STE vault, an account holding system, and a graphical user interface. The data aggregator requests con-sumer data through the data access network, which performs a consumer verification operation by requesting data from the account holding system. The account holding system communicates DDA information and relevant data to the data access network, which performs a tokenization request operation by communicating a tokenization request message including the DDA information to the STE processor. The STE processor tokenizes the DDA information and passes back the token to the data access network, which forwards the token and data to the data aggregator.

In one embodiment, the account holding system commu-nicates consumer verification information directly to the STE processor, which provides a token in response, passed by the data access network to the data aggregator. The data access network operates as a relay between the STE processor and the data aggregator and does not store the DDA information or the consumer verification information.

The method for enhanced data aggregation security involves receiving a request for consumer data from a data aggregator through a data access network, performing a consumer verification operation by requesting consumer verification information from an account holding system through the data access network, communicating the consumer verification information and DDA information to the data access network, performing a tokenization request operation by communicating a tokenization request message including the DDA information to an STE processor communicatively coupled to the data access network, tokenizing the DDA information by the STE processor and passing back a token to the data access network, and forwarding the token and consumer data to the data aggregator by the data access network.

In another embodiment, the consumer verification information is communicated directly to the STE processor from the account holding system, and the STE processor provides a token in response, which is passed by the data access network to the data aggregator. The data access network operates as a relay between the STE processor and the data aggregator and does not store the DDA information or the consumer verification information.

The system and method also include various optional features, such as the use of the RTP® network as the payment network, the generation of pre-approval information by the STE processor to be included with the token and recognized by the account holding system, and the use of specific message formats for communication between the payment network and the account holding system.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
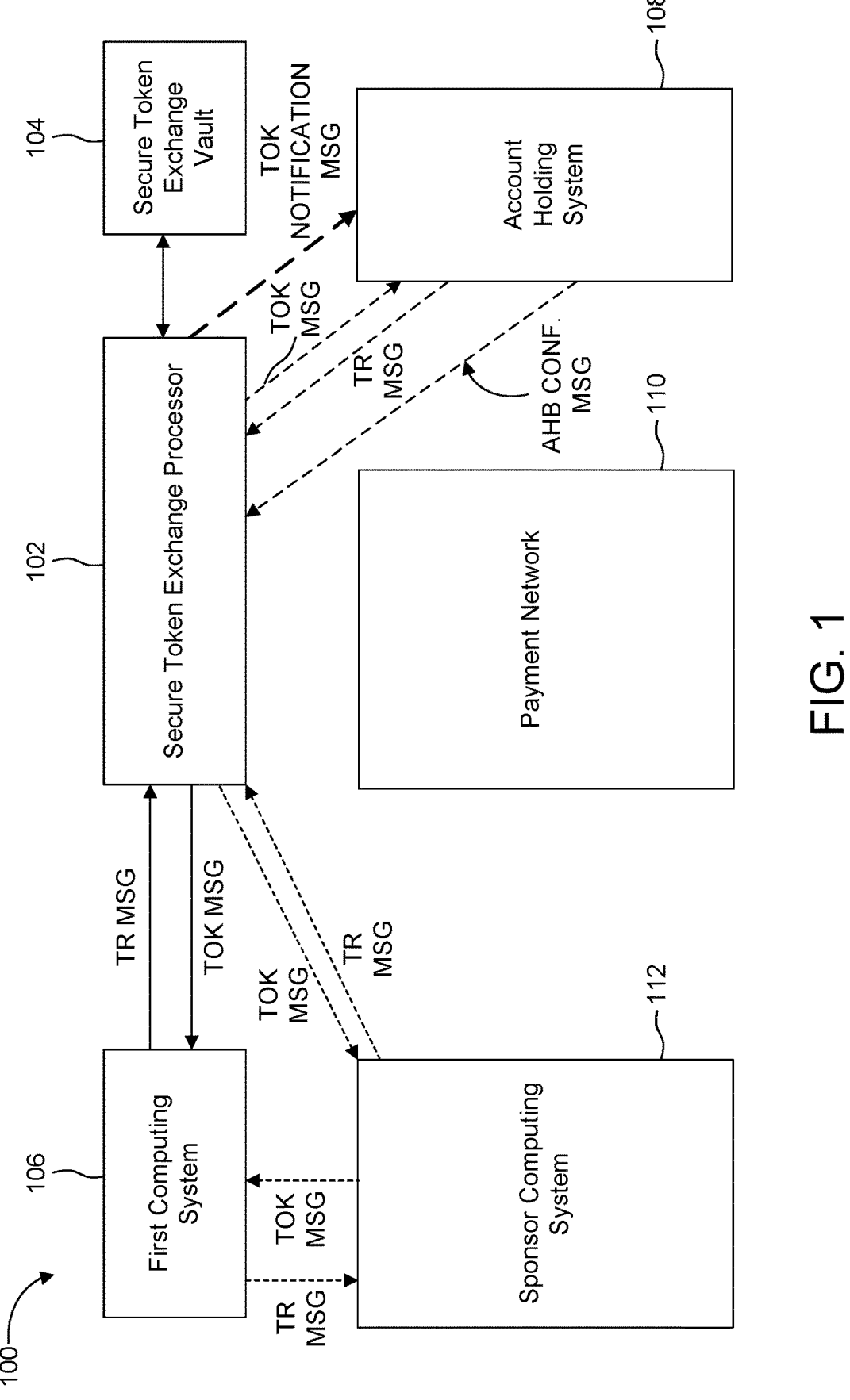
FIG. 1 illustrates a system flow architecture for providing direct secure token provisioning according to an example embodiment.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Definitions

The term "account holding bank" as used herein generally refers to a financial institution that holds and manages deposit accounts on behalf of its customers. These types of banks provide a range of services to their customers, including opening accounts, accepting deposits, processing transactions, providing account statements, and managing the overall relationship between the bank and its customers.

The terms "corporate bank" and "sponsor" as used herein generally refer a financial institution that has been authorized to act as an intermediary between merchants and the payment network. A corporate bank is sometimes referred to as a sponsor because it sponsors or supports other entities, such as merchants or other banks, to participate in the payment system. The corporate bank typically helps merchants to establish a DDA, which enables them to accept payments through the payment network. The sponsor bank may also provide other services such as transaction processing, settlement, and reconciliation.

The term "eligible account number" or "EAN" as used herein generally refers to an account number for which a payment network is authorized to issue one or more tokens.

The term "requestor participant" as used herein generally refers to a participant that authorizes a person or entity as a token requestor.

A "third-party application" as used herein is a software application that is developed and provided by a third-party vendor to add specific functionality to a website. These applications can be, for example, integrated with an e-commerce platform or website to provide additional features and capabilities that may not be available in the core platform. An e-commerce third-party applications can include, for example, a payment gateway that enables an e-commerce website to accept and process online payments from customers.

The term "token" as used herein generally refers to a unique identifier that is used to represent a customer's sensitive payment information, such as an account number. The process of generating a token is called tokenization, which involves randomizing the customer's account information. In some embodiments, randomization can involve replacing the account information with a randomly generated string of characters that has no inherent meaning or value. This token is then used in place of the actual payment information during transactions to help protect the customer's sensitive data. In some embodiments, the string of characters can include numeric numbers. In some embodiments, randomization can involve replacing the account information with a random combination of letters, numbers, symbols, and whitespace that have no inherent meaning or value. In yet other embodiments the process of generating a token involves replacing the customer's account information with, for example, randomly generated numeric values that have no inherent meaning or value.

The term "token participant" as used herein generally refers to a financial institution that authorizes a payment network to issue tokens for its eligible account numbers to token requestors.

The term "token requestor" as used herein generally refers to a token participant or a person that a requestor participant has authorized to request tokens for any token participant's eligible account numbers.

The term "payment processor" as used herein generally refers to the system that manages a transaction process by operating as the mediator between a merchant and any financial institution(s) involved. A payment processor can authorize transactions and works to ensure merchants, suppliers and vendors get paid on time by facilitating the transfer of funds.

As used herein, "merchant," "vendor," "supplier" and the like, are used interchangeably to mean a person, company or other entity that traffics in commodities or vends, supplies or sells.

"Real account information" as used herein generally refers to confidential account information including an actual account number (also referred to as a "real account number") that is used, at least in part, by the bank to manage and process customer transactions, such as deposits, withdrawals, and transfers. In some embodiments the confidential account information includes a routing transit (RT) number as well, so that confidential account information includes the RT number and the actual account number.

A routing transit number, also known sometimes simply as a transit number, is a nine-digit code used in the United States to identify a financial institution in a transaction. This number is used to identify the bank or credit union where an account is held when a transfer is made between accounts, such as a direct deposit or an electronic funds transfer.

Each bank or credit union in the United States has a unique routing number, and it is assigned by the Federal Reserve Bank to identify the financial institution that will be responsible for processing the transaction. The first four digits of the routing number indicate the Federal Reserve Bank's location where the bank is located, while the next four digits identify the bank itself. The final digit is used as a check digit to ensure that the routing number is valid.

In a payment network, a sending participant can refer to a participant or entity that initiates or authorizes a payment transaction. The sending participant typically initiates the payment transaction by submitting payment instructions to the payment network, which then processes and executes the transaction. A receiving participant refers to a participant or entity that receives a payment from a sending participant. The receiving participant typically receives the payment into their account or merchant account, and the payment network facilitates the transfer of funds from the sending participant's account to the receiving participant's account. A participant can communicate a request for payment.

Generally, through the use of a secure token exchange (STE) system (sometimes referred to simply as STE), tokens are provided and managed for the purpose of protecting token participants' account numbers from unnecessary disclosure and misuse. Tokens for EANs are issued to token requestors that can be used in lieu of account numbers in payments, requests for payment, and remittance advices. The tokens can be used for different purposes, such as for making payments, for providing access to systems and devices, and for providing access to accounts, to name a few.

When account information is tokenization real account information is not transmitted along with associated information such as information related to a transaction. DDA tokens are used as a replacement for real account credentials that match a particular form factor of account credentials that they protect. When tokenized, these entities can continue to present payments for these accounts into multiple payment networks (e.g., RTP® network and the ACH network).

Provisioning a token in a payment transaction environment, according to some embodiments, generally involves setting up a token that is used to process payments. Instead of transmitting sensitive payment information like routing transit number and bank account details, a token can be used to represent the information, providing an added layer of security.

In some embodiments, tokens are provisioned to be interoperable across different payment networks, different financial institutions, gateways, and customers of the financial institutions. This allows for more seamless token processing and potentially more efficient and faster transactions.

Payment networks handle a large volume of transactions, which can present technical challenges in terms of ensuring that the detokenization process is scalable and can handle high volumes of requests. Aspects of the provisioning described herein address this challenge as well by leveraging a centralized secure token exchange system as well as a secure token exchange vault that is in communication with one or more payment networks, different financial institutions, gateways, and customers of the financial institutions.

As explained above, there are several technical challenges in tokenizing DDA credentials, particularly in a payment network environment. For one, there are several interoperability considerations. FI systems such as account-holding bank systems typically implement proprietary token programs that do not enable interoperability for all tokens. Thus, a token generated for a first bank may not interoperate with the token of a second bank, inhibiting critical functionality such as real-time payment transactions through a real-time payment network such as the RTP® network or the ACH network. This issue is compounded when the two FI systems between which a transaction is being made are not on the same payment network.

In addition, one merchant (e.g., biller or supplier) may be affiliated with multiple FIs. A payment network does not know which FI system will be used to originate a transaction for the particular merchant. The FI system can be affiliated with the RTP® network and/or the ACH network. But in some cases, an FI system may only work with either the RTP® network or the ACH network. Thus, for tokens to be effective, they must work on both the RTP® network and the ACH network.

The example embodiments described herein balance the desire for a seamless token holder experience with the ability for FI systems to have independent token controls and restrictions. In an example implementation, one control enables the payment network to validate tokens. For example, the payments network can be configured to check that a token is active. As another example of a control, the payment network can be configured to determine whether a token violates any counterparty restrictions. As will be evident from the disclosure, different types of controls can be implemented depending on the application.

In an example implementation, a restriction can be set on all tokens or a set of tokens. For example, an individual token can have a counterpart restriction. As another example, every token created for a particular financial institution can be restricted.

An EAN is an original account that has the potential of having a token created for it. In an example embodiment, an account holding system 108 appoints EANs that are eligible to receive tokens. The account holding system 108 can, in turn, manage the tokens for those accounts. One management function of the account holding system 108 is to instruct STE processor 102 on any token restrictions whether individually or a set of tokens. A set of tokens could, for example, be tokens that were issued to a particular token requestor. Other parameters for other restrictions can be implemented. A token requestor can have assigned to it certain restrictions associated with the tokens provisioned for that token requestor. Thus, for example, when that token requestor with the restrictions requests one or more tokens, STE processor 102 will issue the token or tokens with the particular restriction (e.g., a transaction restriction limit, a counter party restriction, etc.). In an example restriction configuration, the restrictions can be applied at a token requestor level. In another example restriction configuration, the restrictions can be applied to all the tokens. In an example restriction configuration, the restrictions can be applied at a set of tokens.

In an example embodiment, such restrictions get set up in advance through a graphical user interface (GUI) by a user at the account holding bank operating the account holding system 108. The user enters the restrictions via the GUI, which in turn causes the account holding system 108 to communicate the restrictions to STE processor 102 to implement them. Alternatively, such restrictions can be implemented using an application programming interface (API) for STE processor 102.

The architectures described herein can provision tokens according to different use cases.

DIRECT PROVISIONING. FIG. 1 illustrates a system flow architecture for providing direct secure token provisioning 100 according to an example embodiment.

The architecture includes a secure token exchange (STE) processor 102 in communication with a secure token exchange (STE) vault 104, a first computing system 106, an account holding system 108, and a sponsor computing system 112.

STE vault 104 is a secure location or container where sensitive data is stored. STE vault 104, in some embodiments, includes multiple layers of security, such as encryption, access control, and authentication mechanisms. In some embodiments, STE vault 104 is physical. In some embodiments, STE vault 104 is virtual.

In some embodiments, STE vault 104 stores rules and information associated with an account. For example, STE vault 104 can hold various rules related to the security, reliability, and efficiency of a token exchange process. The identification information associated with the token including real account information of the account may also be stored in STE vault 104. Example rules include the restrictions described above.

STE processor 102 and STE vault 104, in some embodiments, are provided as independent components (e.g., provided in different computing devices). In some embodiments, STE processor 102 and STE vault 104 are provided as the same component (e.g., provided as the same computing device or system, referred to collectively as an STE system).

In some embodiments, the STE processor 102 is a subsystem of a payment network 110 (e.g., the payment network being an RTP® network or an ACH network).

First computing system 106, in some embodiments, is system operated by a merchant. Account holding system 108, in some embodiments, is a system operated by a financial institution that holds DDAs and referred to as a financial institution system. In some embodiments, a sponsor computing system 112 is operated by a financial institution (e.g., a corporate bank) that provides services to the operator of the first computing system 106 (e.g., a merchant).

In some embodiments, the STE processor 102 operates to perform a direct-token-request receiving operation that involves receiving, from a token requestor, a direct request for a token prior to the token requestor sending: a payment, a request for payment, or remittance advice related to an account associated with the token.

In some embodiments, direct provisioning is invoked through an application programming interface (API) call to the STE processor 102.

DIRECT REQUEST PROVISIONING: Merchant. In an example implementation, the token requestor is the first computing system 106 (e.g., operated by a merchant, also referred to as a merchant system). The first computing system 106 communicates a request message including account information to STE processor 102, requesting the STE processor 102 to swap the account credentials for one or more accounts in a database of first computing system 106 for a token. In exchange, STE processor 102 returns the token. In some embodiments, the account information is DDA account information.

The first computing system 106 in this example implementation operates as a token requestor. Particularly, first computing system 106 operates to request a token from STE processor 102 by communicating a token request communication message (TR MSG) to STE processor 102. The TR MSG includes real account information of an account (e.g., a DDA) managed by an account holding system 108. The STE processor 102, in turn, operates to receive the TR MSG from first computing system 106. Account holding system 108 operates to hold the account and is operated by a financial institution.

In some embodiments, prior to tokenization, the real account information of the account can reside (e.g., be stored) in the first computing system 106. In some embodiments, the real account information of the account resides (e.g., is stored) in the account holding system 108. In some embodiments, the real account information is stored in both the first computing system 106 and the account holding system 108.

In some embodiments, in response to receiving the TR MSG, STE processor 102 operates to obtain a token (TOK) that includes tokenized real account information formatted for use in a payment transaction. The tokenized real account information corresponds to the real account information of the account identified by the first computing system 106 in the TR MSG and has a data structure that replicates a structure of the real account information of the account. However, the token does not include any actual (i.e., real) account information of the account.

Upon obtaining the token (TOK) from STE vault 104, and in response to receiving the TR MSG, STE processor 102 communicates a tokenized electronic communication message (TOK MSG) to the first computing system 106. The TOK MSG includes the token (TOK) without including the real account information of the account.

DIRECT REQUEST PROVISIONING: Corporate FI/Sponsor. Still referring to FIG. 1, in some embodiments, the token requestor is the sponsor computing system 112. The sponsor computing system 112, in this example embodiment, is in communication with the first computing system 106 (e.g., operated by a merchant) and the STE processor 102. In an application of a practical use case the sponsor that operates sponsor computing system 112 is associated with a merchant that operates first computing system 106.

In this embodiment of direct provisioning, STE processor 102 receives a token request communication message (TR MSG) from sponsor computing system 112 (e.g., a corporate FI system operated by corporate bank).

In some embodiments, prior to tokenization, the real account information of the account for which token information is being requested can reside (e.g., be stored) in the first computing system 106. In some embodiments, the real account information of the account resides (e.g., is stored) in the account holding system 108. In some embodiments, the real account information is stored in the sponsor computing system 112. In some embodiments, the real account information is stored in either or both the first computing system 106 and sponsor computing system 112 for a predetermined amount of time.

In response to receiving the TR MSG, STE processor 102 operates to generate a token (TOK) that includes tokenized account information formatted for use in a payment transaction.

The tokenized account information corresponds to the real account information of the account and has a data structure that replicates a structure of the real account information of the account. However, the token does not include any actual (i.e., real) account information of the account (e.g., the token does not contain the original RT number and/or account number).

After obtaining the token (TOK) in response to receiving the TR MSG, STE processor 102 operates to perform a token communication operation to communicate a tokenized electronic communication message (TOK MSG) to the sponsor computing system 112. In turn, sponsor computing system 112 operates to forward the TOK MSG to the first computing system 106. The TOK MSG includes the token (TOK) without including the real account information of the account.

In an example implementation, the sponsor computing system 112 communicates a request message including DDA information to STE processor 102, requesting the STE processor 102 to swap DDA credentials for one or more accounts in a database of the first computing system 106 for a token. In exchange, STE processor 102 returns the token.

In some embodiments, STE processor 102 operates to generate a token where the token is effective across different payment networks (e.g., RTP® network and ACH network), across different financial institutions, and other third-party systems connected through either a first payment network such as the RTP® network or a second payment network such as the ACH network. The financial institutions (e.g., sponsor computing system 112 and account holding system 108) in the architecture can thus be on the same payment network or different payment networks.

ENROLLMENT AND TOKEN ISSUANCE. A TRID (Token Requestor ID) is a unique identifier assigned to a payment processor or a merchant in a payment network. In some embodiments, the TRID is used to identify the entity that initiates a tokenization request in the payment network 110. A TRID identifies a system that is going to store and use a token. In some cases it might also represent the account holding bank system, if that account holding bank system was the token requestor.

A TRID, in some embodiments, is communicated as part of a token request to request and receive tokens for payment transactions. When a payment processor or merchant requests a token for a payment transaction, they include their TRID in the token request message. STE processor 102, in turn, uses the TRID to verify the identity of the requestor and determine the appropriate level of tokenization, such as the scope of the tokenization or the type of token to be generated.

The TRID, in some embodiments, is used by STE processor 102 to associate the generated token with the payment processor system or merchant system that requested it. This helps to ensure that the token is used only for authorized payment transactions and can be revoked if necessary.

In some embodiments, the STE processor 102 further operates to receive eligible account numbers (EANs) that identify one or more of the participant's routing numbers that are enabled in a payment network such as the RTP® network and the ACH network. A participant may provide a range of account numbers associated with each identified routing number. In turn, the STE processor 102 performs a token issuing operation involving issuing tokens in response to token requests from a token requestor.

In some embodiments, payment network 110 obtains from account holding system 108 a list of EANs that are eligible for tokenization. The payment network 110, in turn, determines whether any given token associated with an EAN is enabled on both the ACH network and the RTP® network. For example, a check that the RT numbers are eligible on both the ACH network and the RTP® network is performed. If not, payment network 110 communicates with the account holding system 108 to either limit the tokens associated with those EANs to only work on one type of payment network (e.g., an ACH network or the RTP® network) or, alternatively, to remove those accounts at the account holding system 108 that are not interoperable across the different type of payments networks from token eligibility. In turn, the list of EANs that are eligible for tokens on both the ACH network and the RTP® network is input in payment network 110 and STE processor 102.

In some embodiments, tokens are created via an application programming interface (API) based direct provisioning and assigned to a single token requestor. Each separate token requestor with a direct connection to STE processor 102 will have its own token program. These tokens can also be defaulted to full interoperability, but each FI has the ability to request that the payment network change their interoperability settings at a token requestor level.

In some embodiments, the token requestor is the account holding system 108. Account holding system 108 can be onboarded to the STE processor 102. In an example implementation, account holding system 108 communicates to STE processor 102 an account holding system configuration message (AHB CONF. MSG) that provides real routing numbers, account ranges, token requestor identifiers (e.g., entity names), and the like that are eligible to receive tokens and related information such as security keys. In some embodiments, account holding system 108 communicates the AHB CONF. MSG directly to STE processor 102 as shown in FIG. 1. In some embodiments, account holding system 108 communicates the AHB CONF. MSG indirectly to STE processor 102 via payment network 110 (not shown in FIG. 1).

DIRECT REQUEST PROVISIONING: Account Holding Bank. In some embodiments, the STE processor 102 receives a token request communication message (TR MSG) from account holding system 108 to have real account information tokenized. In turn, STE processor 102 tokenizes the real account information received from account holding system 108 and sends a tokenized electronic communication message (TOK MSG) to the account holding system 108. The TOK MSG includes the token (TOK) without including the real account information of the account.

In some embodiments, when STE processor 102 tokenizes account information, it informs account holding system 108 about the tokenization. Thus, when a token is provided to first computing system 106 or sponsor computing system 112, STE processor 102 communicates a tokenization notification message (TOK NOTIFICATION MSG) that includes the token (TOK), without including the real account information of the account. In an example implementation, TOK NOTIFICATION MSG is thus not the same as a TOK MSG communicated by the STE processor 102. Instead, TOK NOTIFICATION MSG contains the token (TOK) along with additional information, such as the status of the token.

IN-NETWORK PROVISIONING REQUEST DURING A TRANSACTION. In some embodiments, tokenization of a payee token occurs during a transaction. This is referred to as in-network provisioning.

Figure 2:
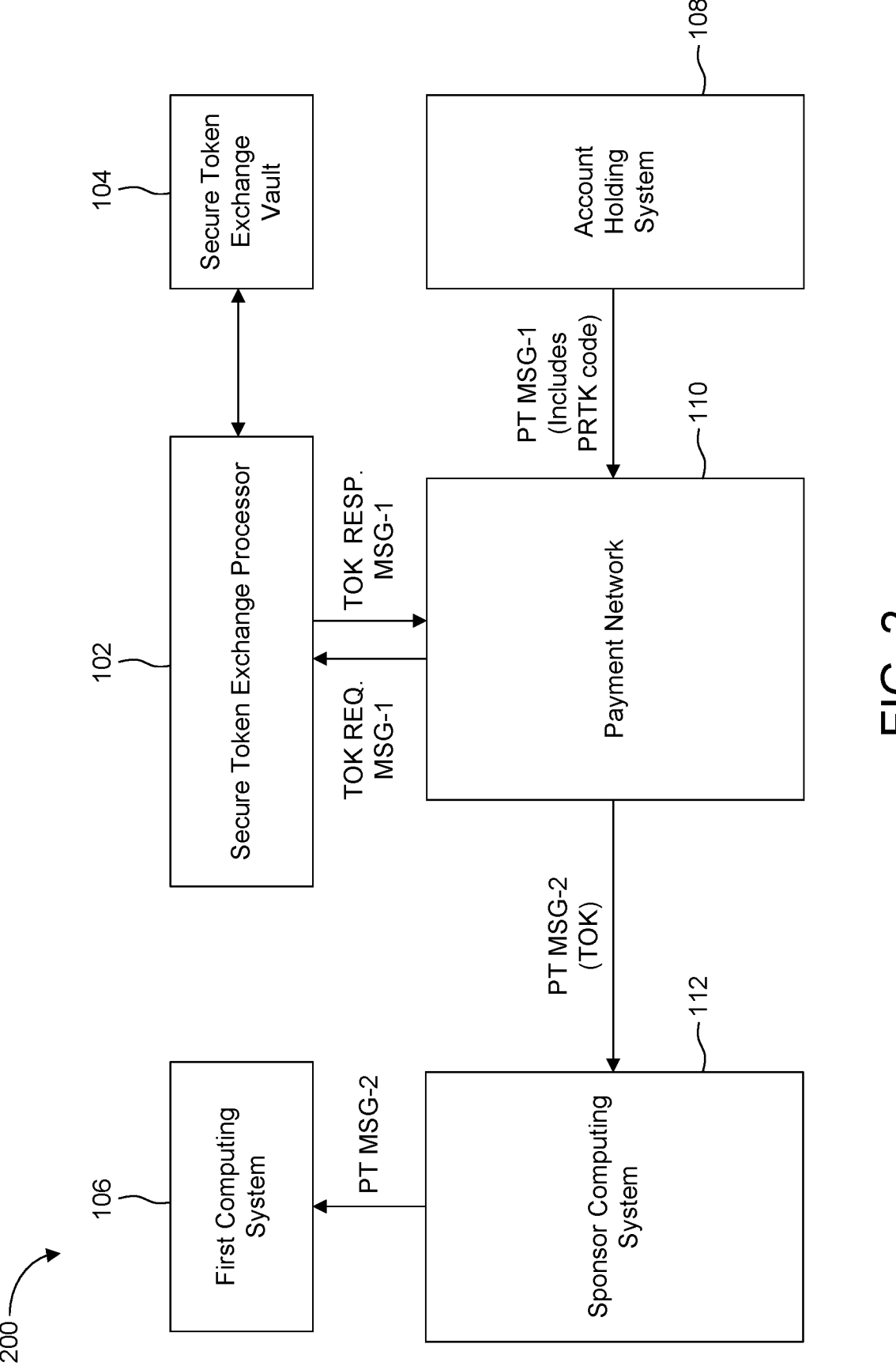
FIG. 2 illustrates a system flow architecture for providing in-network provisioning according to an example embodiment.

FIG. 2 illustrates a system flow architecture 200 for providing in-network provisioning according to an example embodiment. In one implementation of this embodiment, the payment network 110 is an RTP® network. Generally, the payment network 110 receives a payment transaction message with a payment token request (PRTK) code. A payment transaction message with a PRTK code is illustrated as PT MSG-1.

In an example implementation, PT MSG-1 is communicated by an account holding system 108 to provision a token.

Sending, by the account holding system 108, the PT MSG-1 to the payment network 110 causes a call to be made by the payment network 110 to the STE processor 102 to obtain a token corresponding to the sender's account. The call to STE processor 102 is performed by communicating a tokenization request message (TOK REQ. MSG-1) to STE processor 102. TOK REQ. MSG-1 particularly contains a request to provision a token or to look up a previously provisioned token. If a determination is made that the request is to provision a token, upon receipt of the TOK REQ. MSG-1, STE processor 102 generates a token and returns a tokenization response message (TOK RESP. MSG-1) to the payment network 110 with the token information. If a determination is made that the request is to look up a previously provisioned token, upon receipt of the TOK REQ. MSG-1, STE processor 102 obtains the previously mapped token and returns a tokenization response message (TOK RESP. MSG-1) to the payment network 110 with the previously provisioned token information.

Payment network 110, in turn, communicates a payment transaction message including the token (PT MSG-2) to sponsor computing system 112, where the PT MSG-2 contains the token representing the sender's account. In turn, sponsor computing system 112 forwards PT MSG-2 to first computing system 106.

In some embodiments, the STE processor 102 performs an in-network token request operation. The in-network token request operation receives from a sending participant, an in-network request for a token for a customer's account at the time the participant sends a payment message or a request for payment to the system. This operation enables the sending participant to obtain a token for their customer's account at the same time they send a payment message or request for payment.

The in-network request operation is performed by the sending participant including a code (e.g., PRTK code or flag) in a payment transaction message that indicates a request in the message for tokenization.

In-network provisioning can be performed as a result of a request for payment (RfP).

RTP® network in-network provisioning creates the token as part of an RTP® network transaction flow. When the RTP® network receives a real-time payment message with an in-network provisioning flag, a call is made to the STE processor 102 to provision a token or to look up a previously provisioned token. In an example implementation, a PACS.008 message format is used to facilitate payment transfers between banks and financial institutions using the TOK. The PACS.008 message format is managed by the International Organization for Standardization (ISO) under ISO 20022 and is used in the RTP network. The real-time payment message (either a Credit Transfer (PACS.008) or request for payment (RFP) (PAIN.013) (also referred to sometimes as Request to Pay) is, in turn, tokenized by replacing the sending participant's RTN and the sender's account number with the sending participant's token RTN and a token, thus masking the sender's account information in the outbound real-time payment message to the receiving participant.

TOKEN STATES. The status of a token refers to its current state or condition, which can include whether it is active (e.g., has been provisioned) or suspended. The status of a token determines how it can be used or accessed within the payment network 110. For example, if a token is in a restricted status, it may not be available for a payment transaction until certain conditions are met, such as a specific time frame or approval from a designated authority. In an example implementation, a token may be in the following states:

Active—a token is provisioned and ready for use.

Suspended—a token is not active and any messages received in which the token is used will be rejected.

Unlinked—a token is no longer associated with an underlying DDA and is retained only for reporting purposes.

TOKEN VALIDATION: In some embodiments, in response to the direct tokenization request, STE processor 102 performs a token issuance validation operation. The validation operation is performed, for example, to validate that the account number for which a token is requested is an eligible account number (EAN). In some embodiments, the validation operation includes determining if the request is for a restricted token. If a determination is made that the request is for a restricted token, the token participant has either required or permitted the issuance of restricted tokens for the EAN. If a determination is made that the request is for an unrestricted token, the token participant has not required the issuance of restricted tokens for the EAN.

Figure 3:
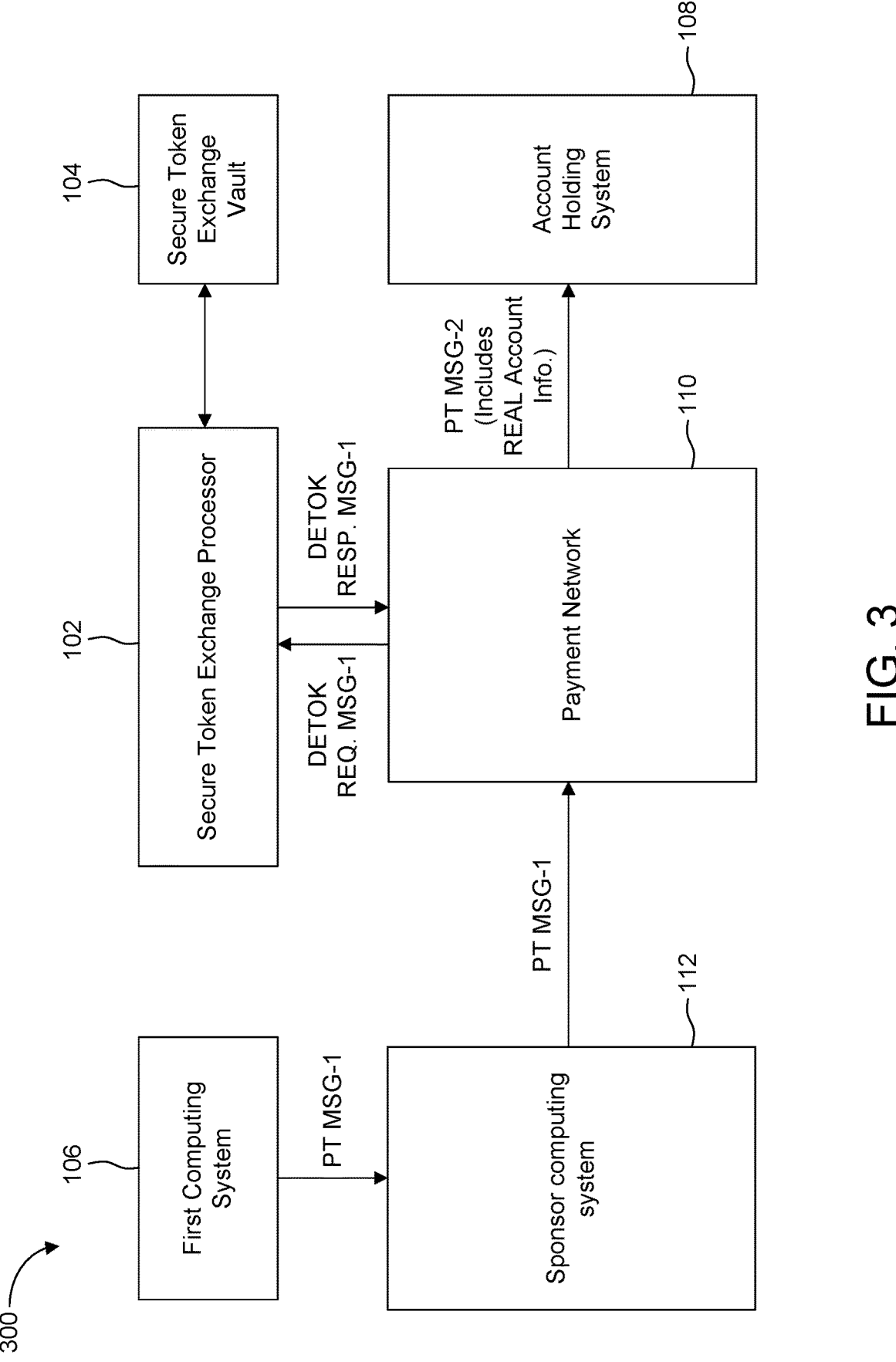
FIG. 3 illustrates a system flow architecture for providing a tokenized credit transfer in an RTP® network according to an example embodiment.

RTP® NETWORK TRANSACTION FLOW. FIG. 3 illustrates a system flow architecture 300 for providing a tokenized credit transfer in an RTP® network according to an example embodiment. This transfer architecture 300 depicts detokenization within a transaction flow for an RTP® network.

In some embodiments, first computing system 106 communicates a first payment transaction message (PT MSG-1) to sponsor computing system 112. PT MSG-1 contains a token (TOK) to be detokenized. In turn, sponsor computing system 112 forwards the PT MSG-1 message to the payment network 110, which in this example is an RTP® network. Payment network 110 receives PT MSG-1 and detects the message contains a token. In an example implementation, detection can be accomplished by detecting within the PT MSG-1 message that there is a tokenized routing transit number in a field of the message packet. In turn, payment network 110, in this RTP® network example, communicates a detokenization request message (DETOK REQ. MSG-1) to STE processor 102. STE processor 102 uses the DETOK REQ. MSG-1 to retrieve the real account information from STE vault 104 by mapping the token in the DETOK REQ. MSG-1 to real account information stored in the STE vault 104. STE vault 104 returns to STE processor 102 a detokenization response message (DETOK RESP. MSG-1) in response to the DETOK RESP MSG-1. It should be understood that the format and operations between the STE processor 102 and STE vault 104 may be performed in a different manner. For example, STE processor can operate to identify a business key of a record it needs to retrieve. The key is a unique identifier for the record. The key can, in an example implementation, be used to find a first table that contains the record. Once the first table has been identified, a surrogate key for the record is obtained. The surrogate key is a unique identifier assigned by the data vault system. In turn, the surrogate key is used to find corresponding second tables that contain additional details about the record. Each second table contains a subset of the data associated with a particular business entity. In some architectures, the first table is referred to as a Hub table, and the second tables are each referred to as a satellite table. Finally, a third table, referred to as a link table, is used to join the first table and second table(s) together and retrieve the complete record.

STE processor 102, in turn, forwards the DETOK RESP. MSG-1 to payment network 110. Payment network 110, in turn, communicates a second payment transaction message (PT MSG-2) that includes real account information, to account holding system 108.

Figure 4:
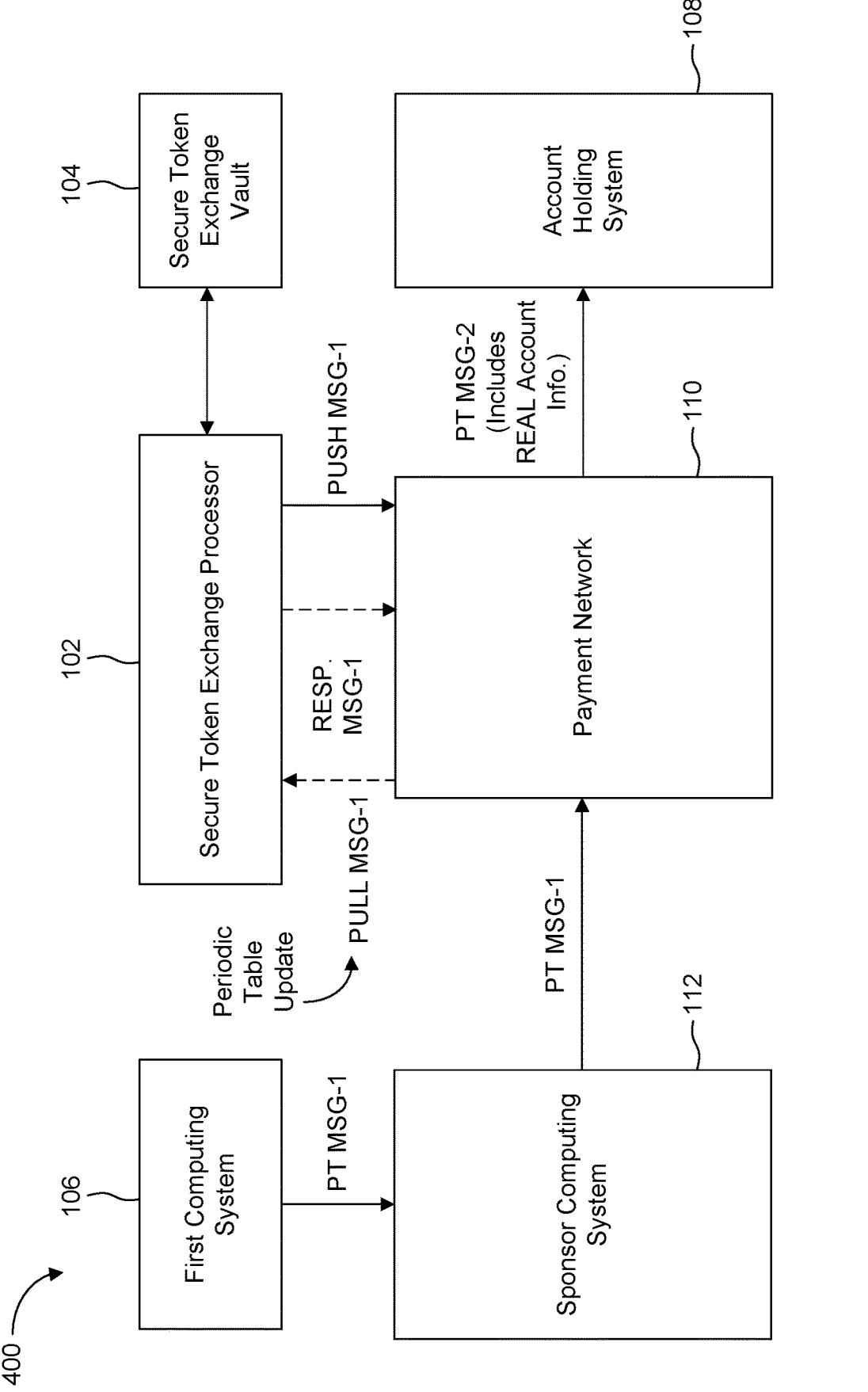
FIG. 4 illustrates a system flow architecture for providing a tokenized credit or debit transfer in an ACH network according to an example embodiment.

ACH NETWORK TRANSACTION FLOW. FIG. 4 illustrates a system flow architecture for providing a tokenized credit or debit transfer in an ACH network according to an example embodiment. An ACH network transaction flow including detokenization is now described. In an example use case, first computing system 106 communicates a first payment transaction message (PT MSG-1) to sponsor computing system 112. PT MSG-1 contains a token (TOK) to be detokenized. In turn, sponsor computing system 112 forwards the PT MSG-1 message to the payment network 110, which in this example is an ACH network. Payment network 110 receives PT MSG-1 and detects the message contains a token. In turn, payment network 110 in this ACH network example communicates a detokenization request message (DETOK REQ. MSG-1) to STE vault. STE vault 104 uses the DETOK REQ. MSG-1 to retrieve the real account information by mapping the token in the DETOK REQ. MSG-1 to real account information stored in the STE vault 104 has stored. STE vault 104 returns to payment network 110 a detokenization response message (DETOK RESP. MSG-1). Payment network 110, in turn, communicates a second payment transaction message (PT MSG-2) that includes real account information to account holding system 108.

This transfer architecture flow 400 depicts detokenization within a transaction flow for an ACH network.

Payment network 110 (i.e., an ACH network) receives from the first computing system 106 via the sponsor computing system 112 and the payment network 110 a credit transfer type payment transaction message or a debit transfer type payment transaction message (PT MSG-1).

In an example implementation, a table containing mappings of real account information and tokens is stored in STE vault 104 and retrieved by STE processor 102. In some embodiments, the table is retrieved by STE processor 102 from STE vault 104 periodically. For example, the table is communicated by STE vault 104 to STE processor 102 to every predetermined time period (e.g., every few minutes, 0.5 hrs, 1 hrs, 2 hrs, 4 hrs, 8 hrs, 12 hrs, 16 hrs, 20 hrs, 24 hrs, etc.). Upon retrieving the table, the STE processor 102 pushes the update to payment network 110 (PUSH MSG-1).

In some embodiments, STE processor 102 causes the STE vault 104 to generate the table and pulls the table from STE vault 104 when needed.

In some embodiments, a table containing mappings of real account information and tokens is requested by payment network 110. In an example implementation, payment network 110 requests the table from STE processor 102 by communicating a message requesting the table (PULL MSG-1). The table can also contain a status for each token identified in the table. In some embodiments, the table is requested by payment network 110 periodically. For example, the table can be communicated every predetermined time period (e.g., every few minutes, 0.5 hrs, 1 hrs, 2 hrs, 4 hrs, 8 hrs, 12 hrs, 16 hrs, 20 hrs, 24 hrs, etc.)

Payment network 110 (i.e., an ACH network), in turn, operates to communicate a second payment transaction message (PT MSG-2) including the ACH formatted payment transaction information to effect the ACH transaction, which may be a credit transaction or a debit transaction. PT MSG-2 includes real account information.

In some embodiments, a validation operation is performed to determine whether a credit transaction or debit transaction is permitted for a particular account. In some embodiments, this determination is performed by payment network 110. In some embodiments this is performed by the STE processor 102. In some embodiments, this check is performed against the token.

Figure 5:
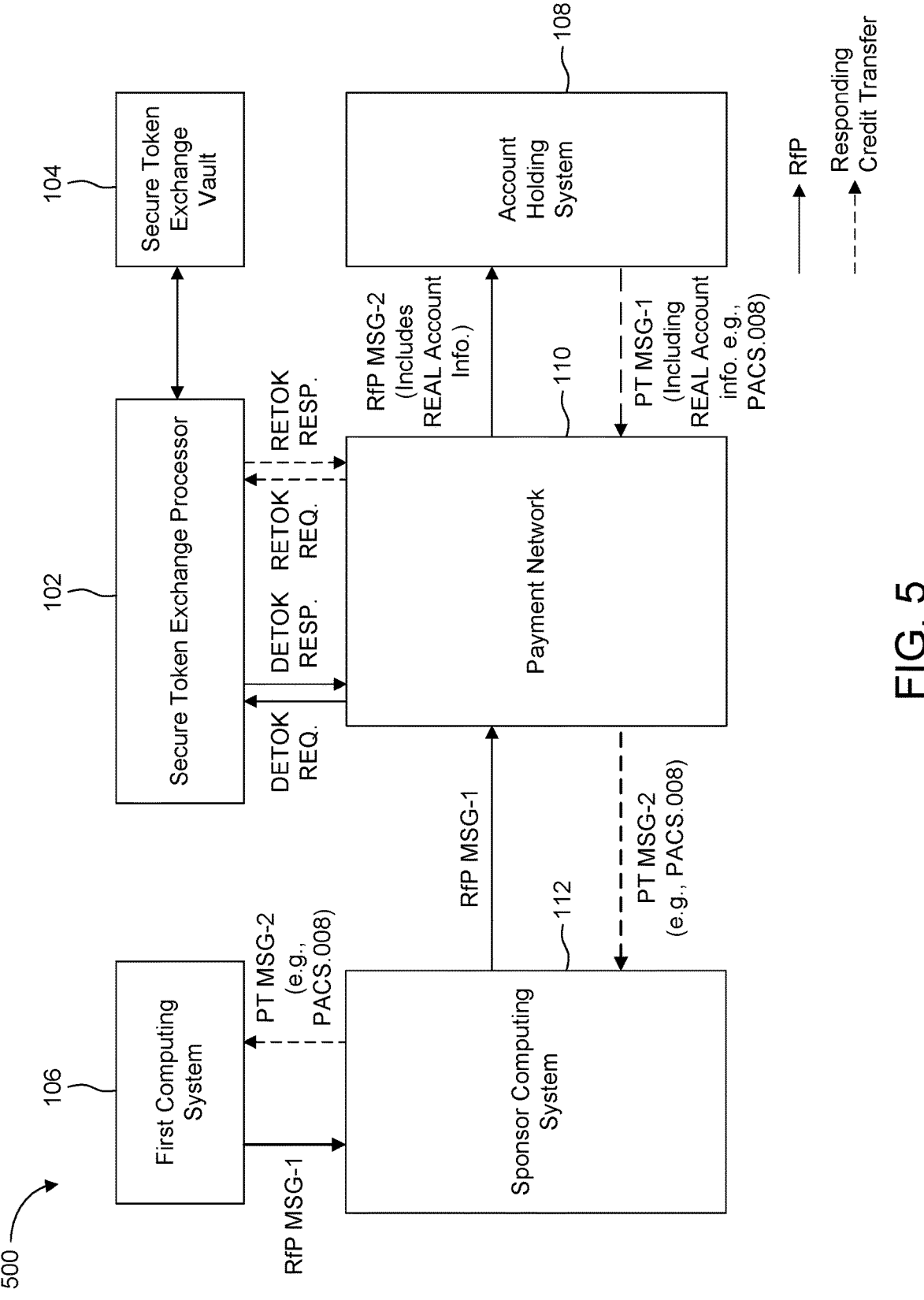
FIG. 5 illustrates a system flow architecture for providing requests for payment (RFP) and subsequent credit transfers according to an example embodiment.

REQUEST FOR PAYMENT (RfP) AND CREDIT TRANSFER. FIG. 5 illustrates a system flow architecture for providing requests for payment (RFP) and subsequent credit transfers according to an example embodiment. In some embodiments, a payment transaction contains two accounts, an account of a sender and an account of a receiver. The payment network 110 stores in its database the two accounts. It may be the case that both accounts are tokenized, one of the two accounts is tokenized, or none of the accounts is tokenized.

In this embodiment, first computing system 106 issues a first request for payment message (RfP MSG-1) containing a token. In an example embodiment, RfP MSG-1 is communicated by first computing system 106 to sponsor computing system 112. In turn, sponsor computing system 112 forwards RfP MSG-1 to payment network 110. Payment network 110, in turn, issues a detokenization request to STE processor 102 to retrieve detokenized data corresponding to the account associated with the RfP MSG-1. This request is in the form of a detokenization request message (DETOK REQ.) containing the token obtained from RfP MSG-1. STE processor 102, in turn, receives the DETOK REQ. and uses it to retrieve the detokenized information from STE vault 104. Upon retrieval, STE processor 102 returns the detokenized account credential to payment network 110 in the form of a detokenization response message (DETOK RESP.). In turn, payment network 110 transmits to the account holding system 108 a second request for payment message (RfP MSG-2) message including the real account information and any additional payment information necessary to effect payment. Thus, RfP MSG-1 is a request for payment message including tokenized account information, but RfP MSG-2 is a request for payment message including detokenized account information. Both RfP MSG-1 and RfP MSG-2 contain the particulars regarding the underlying transaction for which payment is requested (e.g., payment amount, date, and any other relevant transaction data). RfP MSG-2, in some embodiments, also contains the original token communicated by the first computing system 106 in RfP MSG-1.

In response to receiving RfP MSG-2, account holding system 108 executes the credit transfer. Account holding system 108 transmits to payment network 110 a first payment transaction message (PT MSG-1) to complete the credit transfer. In some use cases, there is a delay between the RfP MSG and the subsequent credit transfer. The reason for the lag is that a consumer on the receiving side of the RfP may be required to authorize the credit transfer before the RfP proceeds to be processed. Payment network 110, in turn, communicates the real account information in PT MSG-1 to STE processor 102 in the form of a retokenization request message (RETOK REQ.), requesting the STE processor 102 to retokenize the real token. In turn, STE processor 102 retokenizes the token and communicates to payment network 110 a retokenization response message (RETOK RESP.) including a retokenized token. In some embodiments, RETOK REQ. contains the original token communicated by the first computing system 106 to sponsor computing system 112 in RfP MSG-1.

In turn, payment network 110 communicates to sponsor computing system 112 a second payment transaction message (PT MSG-2) including the retokenized information. In turn, sponsor computing system forwards PT MSG-2 to the first computing system 106.

In some embodiments, PACS.008 formatted messages are used for communicating credit pushes and PAIN.013 formatted messages are used for communicating RfP messages.

In some embodiments, the STE processor 102 validates a token. In an example embodiment, STE processor 102 generates pre-approval information to be included with the token, where the pre-approval information is configured to be recognized by the account holding system 108. The pre-approval information, for example, indicates a pre-approved status of the payment transaction. In some embodiments, the DETOK RESP. from the secure token exchange processor 102 includes the pre-approval information by virtue of including a token.

In some embodiments, the payment network 110 receives in the first payment transaction message PT MSG-1 from the account holding system 108 an indication that the credit transfer to sponsor computing system 112 has been pre-approved.

In some embodiments, payment network 110 can make particular decisions on whether and how to proceed with a transaction. In the case where the payment network is the RTP® network, for example, the RTP® network can make decisions on whether and how to proceed with a transaction. For example, if a transaction meets a particular dollar amount threshold, the RTP® network can decide to proceed or not to proceed with the transaction.

Payment networks are typically under time constraints, and so is a receiving FI system. In some cases, the FI system has opted to let the payment network make decisions on its behalf, while in others it prefers to make those decisions on its own. Such decisions include validations associated with a token, e.g., a decision to reject transaction containing suspended tokens.

In the case of the RTP® network, for example, the RTP® network is required to dispose of a transaction within a finite amount of time. Thus, there is a need for a mechanism that allows the FI systems to provide the payment networks the ability to execute policies on their behalf. To this end the STE processor 102, in some embodiments, is configured to store and execute policies associated with one or more banking systems. The policies can be in the form of rules that can be executed by STE processor 102. The policies can be, in some embodiments, generated by the one or more FI systems such as account holding system 108. Thus, rather than have an FI system perform a rejection, the STE processor 102 performs the rejection on behalf of the FI system. In an example use case, a financial institution policy executed by STE processor 102 may trigger a fault. In turn, the fault can cause the STE processor 102 to communicate the transaction credentials along with the fault to the corresponding financial institution system (e.g., account holding system 108 or sponsor computing system 112). In return, the financial institution system performs a determination whether to proceed with the transaction and informs the payment network 110 accordingly.

TOKEN MANAGEMENT. During the provisioning process, a new token is generated (in an active state) and linked to a real account number as described above. Changing a token state is possible by direct instruction via the customer service portal by the token participant. An active token can be suspended or unlinked from the real account number. A token in a suspended state can be re-activated (resumed) or unlinked from the real account. Unlinking a token permanently disables the token and, in some implementations, is non-reversible. Once a Token account is unlinked, it can no longer be used for ACH entries or real-time payment entries and cannot be reissued to any party for a predetermined amount of time. Also, after a predetermined time, the unlinked token's associated real account information is deleted.

In some embodiments, each token can be turned on or off independently. In some embodiments, the tokens are defaulted to non-restricted, fully interoperable tokens. However, a financial institution (FI) system has the option to modify their interoperability setting for all of their own generated tokens. General-use tokens are tokens requested via API by, for example, an account-holding-bank. In some embodiments, these tokens are issued to the FI system (not a separate token requestor) and are assigned to that FI's unique token requestor identifier (TRID). They are defaulted to full interoperability, but the financial institution can modify the setting if needed. In some embodiments, all tokens issued to a financial institution have the same interoperability settings.

In yet another aspect, the STE processor 102 performs a revocation operation involving revoking by a requestor participant its sponsorship of a token requestor that the participant previously sponsored. Once the revocation has been processed by the STE processor 102, it will no longer issue tokens to the person previously sponsored as a token requestor, unless another requestor participant sponsors or has sponsored the person as a token requestor. Revocation of a token requestor's sponsorship will not deactivate the tokens issued to the token requestor. Deactivate as used herein is also referred to as "unlink" and "delete."

Another aspect involves storing a token participant's tokens and their associated account numbers. In an example implementation, the STE performs a storing operation involving storing a token participant's tokens and their associated account numbers while the tokens are active and for at least a predetermined time (e.g., 5 years from the date that a token was deactivated).

A token can be retained in a vault for an additional amount of time, e.g., for purposes of audit, compliance or clearing and settlement. A token may have the following lifecycle states:

Active—a token is provisioned and ready for use

Suspended—a token is not active and any messages received in which the token is used will be rejected.

Unlinked—a token is no longer associated with an underlying DDA and is retained only for reporting purposes.

To manage these states, participants can use a STE-DDA customer service portal or APIs to perform the following actions:

Inquire—A request for information about the status of a token.

Suspend—Command to place a token in the suspended state.

Resume—Command to move a suspended token into the active state.

Unlink—Command to move a suspended token into the deleted state.

Tokens can be provisioned for a token participants' accounts to a third party (non-bank) token requestor that is sponsored by a token participant to request tokens from the STE processor. The program settings are initially defaulted to full interoperability (available for use on both the RTP® network and ACH network and for both ACH credits/debits). A token participant's initial settings apply to all token requestors that request tokens for the participant's accounts. Each token participant has the ability to configure their interoperability settings at a token requestor level via a customer service portal. In some embodiments, a token participant may modify interoperability settings for a particular token requestor after tokens have been issued to that token requestor because token participants may not know the existence or identity of a token requestor prior to token issuance. Token participants can monitor the customer service portal to become aware of the token requestors receiving tokens for the token participant's accounts. Interoperability management and lifecycle management are complementary—and can both prevent unwanted transactions. In some embodiments, they are separate tools with separate inputs. For example, a token could remain in an active lifecycle state, but have an interoperability setting of on for real-time payments through the RTP® network, but be turned off for both ACH credit and ACH debit. Changing a token's lifecycle setting to suspend/unlink or modifying certain interoperability settings will both result in the rejection of transactions containing tokens with those settings where the token is used inconsistently with those settings (e.g., in the ACH network when the token is set for real-time payments through the RTP® network only). In some embodiments, a customer service portal can be used to manage how token requestors are permitted to use tokens. The token programs settings can be changed by accessing a configuration menu via a consumer service portal. In some embodiments a token programs can be disabled entirely by a financial institution—disabling a token programs will disable the use of tokens for ACH network or RTP® network transactions correspondingly. In some embodiments, default settings for real-time payments through the RTP® network, ACH network credit/debit can be configured—as new token requestors related to the corresponding token participant are added, these default values are used for real-time payments via the RTP® network, ACH Credit and ACH Debit settings. In some embodiments, individual token requestor settings for RTP, EPN (ACH) Credit/Debit can configured—tokens requested by each token requestor can be configured to enable/disable use for real-time payments through the RTP® network, ACH Credit or ACH Debit transactions Changing a token program's setting after a token has been issued will result in the various actions. For real-time payments through the RTP® network, turning off real-time payment acceptance for a particular interoperability program will disallow all tokens associated with that program to process on the RTP® network. During transactional processing, the STE will flag a token not eligible for real-time payments processing and the RTP® network will then reject the transaction.

For ACH network transactions, if a new token is added to the STE-DDA, it will appear in the next delta file (prior to next processing window) as new with the appropriate flags (Credit/Debit) set. In some embodiments, if one option (credit or debit) was turned off but the other remained on, then the next delta file would provide an update, and the token will remain in the database with the one remaining interoperability option. If both options (credit and debit) are turned off, then the next delta file updates the ACH network to remove both interoperability options. In some case, transactions containing that token will be rejected, but the token itself will remain in the ACH database. If either option (credit or debit) is turned back on after both had been turned off, then the next delta file can once again include a record for that token and ACH network would update the record to reflect the new settings.

CONNECTED BANKING/DATA AGGREGATION. A typical data aggregator is a system that aggregates data that has previously gained account information. Some data aggregators operate several e-commerce third party applications.

The way in which the data is collected can vary depending on the source. In cases where data is transmitted in plain text, it can potentially be intercepted and read by third parties, which is undesirable as it reduces the privacy and security of that data significantly. Each e-commerce third party application typically receives the same real account. If that account gets hacked, all the entities associated with that account can suffer a significant security breach.

There is currently no mechanism that can be integrated into a payment network that avoid these issues. Instead of providing real account credentials to be used for a payment transaction it would be desirable to instead used tokenized account credentials, particularly such that each data aggregator's e-commerce third party application has its own tokenized account credential.

Aspects described herein provide third party applications with their own tokenized account information. Thus if one third party application is breached, the other third party applications is not by association with the same data aggregator, also breached.

Figure 6:
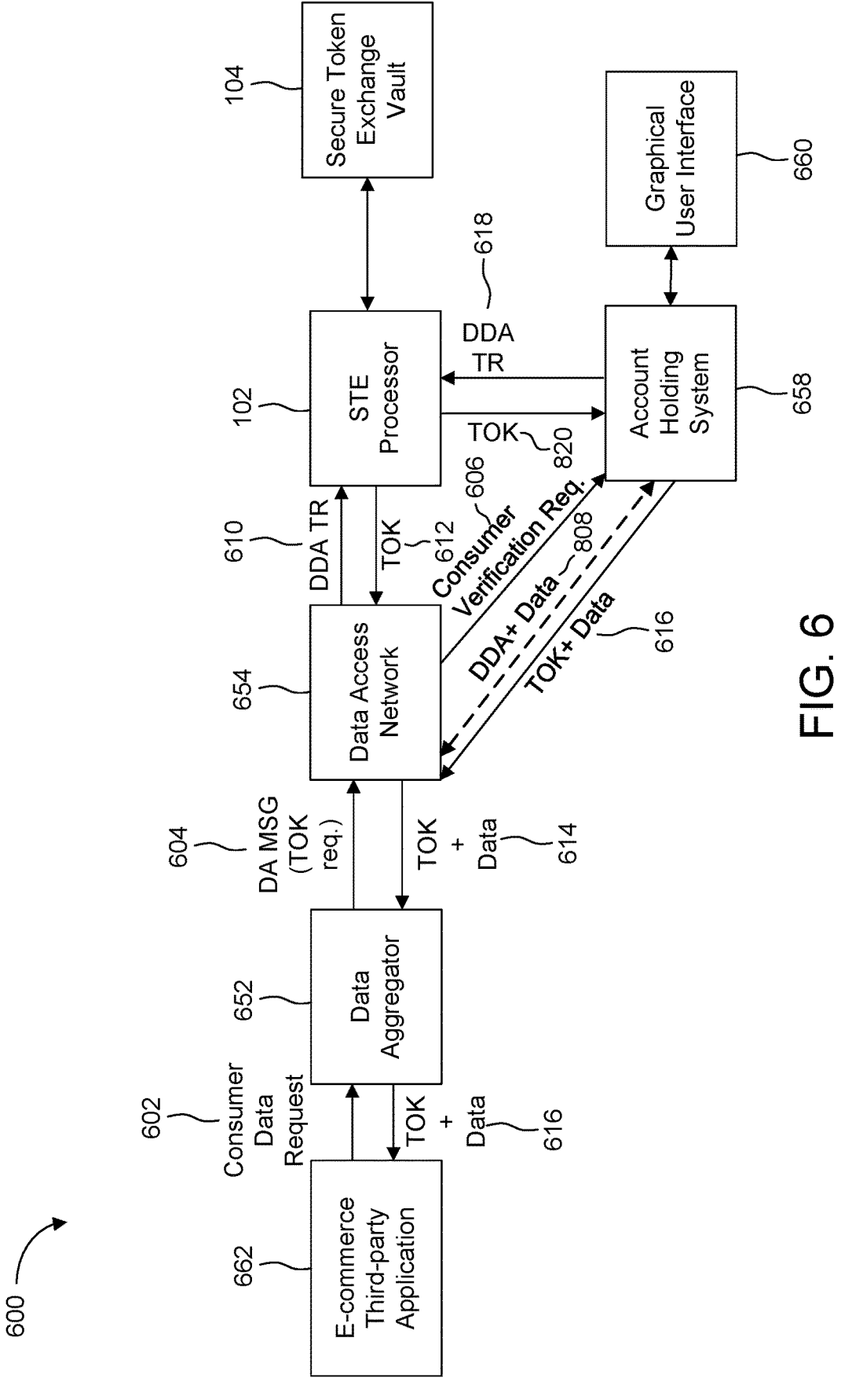
FIG. 6 illustrates a system-flow diagram of an enhanced data aggregation security architecture according to an example embodiment.

FIG. 6 illustrates a system-flow diagram of an enhanced data aggregation security architecture 600 according to an example embodiment. The enhanced data aggregation security architecture 600 includes a data aggregator 652, a data access network 654, a STE processor 102 including or communicatively coupled to an STE vault 104, and an account holding system 658. The account holding system 658 is communicatively coupled to a graphical user interface 660. A data access network 654 connects systems that hold consumer data (e.g., consumer financial data) to aggregators such as data aggregator 652. The data access network 654 in this embodiment is communicatively coupled to STE processor 102.

In an example embodiment, e-commerce third party application 612 operates to perform e-commerce and in so doing request consumer data. The consumer data itself is not critical and can be any data required by the e-commerce third party application 612 that is held by account holding system 658 or provided by a user via graphical user interface 660. An example of consumer data can be a real account information. A consumer data request operation 652 communicates a consumer request message from data aggregator 652. Data aggregator 652, in turn, performs a data aggregator request operation 604 that performs requesting from data access network 654 tokenized data. Before data access network 654 can obtain the data requested by data aggregator 652, the data access network 654 performs a consumer verification operation 606 that performs requesting from accounting holding system 658 DDA information as well the data requested by e-commerce third party application 662.

In some embodiments, account holding system 658 triggers graphical user interface 660 to perform a process such as requesting additional information or performing a security check, for example, by causing a code to be communicated to a consumer and requiring the consumer to enter the code via the graphical user interface 660).

In an example embodiment, account holding system 658 communicates the consumers DDA and relevant data to data access network 654 as show by DDA account and data message operation 608. In turn, data access network 654 performs a DDA tokenization request operation 610 by communication a tokenization request message including the DDA information to STE processor 102. STE processor 102, in turn, tokenizes the DDA information and passes back the token as illustrated by token response operation 612. In turn, data access network 654 collects the token and the data previously obtained from the account holding system 658 and forwards the token and data to data aggregator 652 (operation 614), which in turn forward the token and data to e-commerce third-party application 662 (operation 616).

In an alternative embodiment, upon receiving a consumer verification request (e.g., operation 606 and performing any additional steps with graphical user interface 660), account holding system 658 operates to communicate a DDA tokenization request to STE processor 102 (operation 618). In turn, STE processor 102 returns the token (operation 620) to account holding system 658, which in turn turns both the token (TOK) and data requested by e-commerce third-party application 662 to data access network 654 (operation 616). In turn, data access network 654 operates to forward the TOK and data to data aggregator 652 which forward the TOK and data to e-commerce third-party application 662 as illustrated by operations 614 and 616.

In an example implementation, the connections are made through the use of respective application programming interfaces (APIs).

The account holding system 658 system operates as an ACH network or RTP® network endpoint.

As explained above, a data aggregator, such as data aggregator 652, typically is provided an interface for a user to enable the user to provide account credentials to the data aggregator 652. In an example use case, a consumer is no longer required to provide account credentials to the data aggregator. Instead, verification of a consumer is redirected to the account holding system 658. A user enters consumer verification information directly into account holding system 658 (e.g., a financial institution system). The account holding system 658, in turn, transmits DDA information to STE processor 102 via the data access network 654 or directly STE processor 102 to have the STE processor 102 provide a token (TOK). In turn, the token (TOK) is passed, by the STE processor 102 to the data access network 654 and then to the data aggregator 652. A similar process occurs if the data aggregator is replaced with a third party application. In some embodiments, the data access network 654 does not store the DDA information or the consumer verification information, but instead operates as a relay between the systems.

By using tokens, the account holding system 658 maintains the ability to protect the consumer's data because the communications path between the account holding system, the data access network and the STE processor 102 is generally considered highly secure. Advantageously, the data aggregator does not receive the real DDA credentials. In an example embodiment, tokenization can be performed prior to sharing a real DDA. In some embodiments, a connection is provided between the STE processor 102 and the data access network 654 that enables token provisioning across all token requestors that have been sponsored by a requestor participant and are also connected to the data access network 654.

In some embodiments, the account holding system 658 controls which DDAs become tokenized. The determination can be based on numerous factors. In an example embodiment, the routing transaction identifier dictates whether the DDA credentials are eligible to be tokenized. In some use cases, some accounts may not be tokenized.

In yet another example embodiment, the data access network 654 request the token on behalf of the data aggregator 652.

As explained above, data access network 654 can operate as a gateway for data aggregator 652. The data access network 654 can integrate an API for the account holding system 658 exchange the DDA and consumer verification information. Just as an API can be used to integrate the account holding system 658, an API can be integrated for use with ecommerce third party applications 662.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine, readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the FIGS. 1-6 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

ADDITIONAL CLAUSES

The following are additional clauses relative to the present disclosure, which could be combined and/or otherwise integrated with any of the embodiments described above or listed in the claims below.

Clause 1. A system for direct secure token provisioning, comprising:

a secure token exchange (STE) processor (102) in communication with a secure token exchange (STE) vault (104), a first computing system (106), an account holding system (108), and a sponsor computing system (112); and wherein the STE processor (102) is configured to receive a direct-token-request from a token requestor prior to the token requestor sending a payment transaction message or a request for payment message, and wherein the STE vault (104) stores rules and information associated with the account.

Clause 2. A method for direct secure token provisioning, comprising:

receiving, from a token requestor, a direct request for a token prior to the token requestor sending a payment transaction message or a request for payment message;

storing rules and information associated with the account in a secure token exchange (STE) vault (104); and processing the direct request for the token using an STE processor (102) in communication with the STE vault (104).

Clause 3. A system for tokenizing account information, comprising:

a first computing system (106) configured to communicate a token request communication message (TR MSG) to a secure token exchange (STE) processor (102), the TR MSG including real account information of an account managed by an account holding system (108);

the STE processor (102) configured to receive the TR MSG from the first computing system (106), and in response to receiving the TR MSG, obtain a token (TOK) that includes tokenized real account information formatted for use in a payment transaction, the tokenized real account information corresponding to the real account information of the account identified by the first computing system (106) in the TR MSG and having a data structure that replicates a structure of the real account information of the account; and the STE processor (102) further configured to communicate a tokenized electronic communication message (TOK MSG) to the first computing system (106), the TOK MSG including the token (TOK) without including the real account information of the account.

Clause 4. The system of clause 3, wherein the real account information of the account resides in the account holding system (108).

Clause 5. The system of clause 3, wherein the real account information of the account resides in the first computing system (106).

Clause 6. A method for tokenizing account information, comprising:

receiving a token request communication message (TR MSG) from a first computing system (106), the TR MSG including real account information of an account managed by an account holding system (108);

obtaining a token (TOK) that includes tokenized real account information formatted for use in a payment transaction, the tokenized real account information corresponding to the real account information of the account identified by the first computing system (106) in the TR MSG and having a data structure that replicates a structure of the real account information of the account; and communicating a tokenized electronic communication message (TOK MSG) to the first computing system (106), the TOK MSG including the token (TOK) without including the real account information of the account.

Clause 7. The method of clause 6, wherein the real account information of the account resides in the account holding system (108).

Clause 8. The method of clause 6, wherein the real account information of the account resides in the first computing system (106).

Clause 9. A system for tokenization of account information, comprising:

a sponsor computing system (112) configured to communicate a request message including account information to a secure token exchange (STE) processor (102) for tokenization;

the STE processor (102), configured to receive the request message and generate a token (TOK) that includes tokenized account information formatted for use in a payment transaction, and further configured to communicate the token (TOK) to the sponsor computing system (112) without including the real account information of the account; and a first computing system (106) in communication with the sponsor computing system (112) and configured to receive the tokenized account information from the sponsor computing system (112) for use in a payment transaction; wherein the sponsor computing system (112) is configured to forward the tokenized electronic communication message (TOK MSG) to the first computing system (106) without including the real account information of the account.

Clause 10. The system of clause 9, wherein the token (TOK) generated by the STE processor (102) is effective across different payment networks and different financial institutions, and wherein the financial institutions can be on the same or different payment networks.

Clause 11. The system of clause 9, wherein the real account information of the account resides in the sponsor computing system (112) for a predetermined amount of time prior to tokenization, and further wherein the real account information may also reside in the first computing system (106) or an account holding system (108).

Clause 12. A method for tokenizing account information, comprising:

receiving a request message including account information from a sponsor computing system;

generating a token (TOK) that includes tokenized account information formatted for use in a payment transaction;

communicating the token (TOK) to the sponsor computing system without including the real account information of the account; and forwarding the tokenized electronic communication message (TOK MSG) to a first computing system without including the real account information of the account.

Clause 13. The method of clause 12, wherein the token (TOK) generated by the STE processor is effective across different payment networks and different financial institutions, and wherein the financial institutions can be on the same or different payment networks.

Clause 14. The method of clause 12. wherein the real account information of the account resides in the sponsor computing system for a predetermined amount of time prior to tokenization, and further wherein the real account information may also reside in the first computing system or an account holding system.

Clause 15. A system for tokenization of account information, comprising:

a secure token exchange (STE) processor (102) configured to receive a token request communication message (TR MSG) from an account holding system (108) requesting tokenization of real account information;

the STE processor (102) configured to tokenize the real account information and generate a token (TOK); and the STE processor (102) configured to send a tokenized electronic communication message (TOK MSG) to the account holding system (108), wherein the TOK MSG includes the token (TOK) and excludes the real account information.

Clause 16. The system of clause 15, wherein the STE processor (102) is further configured to communicate to the account holding system (108) a tokenization notification message (TOK NOTIFICATION MSG) that includes the token (TOK) and additional information regarding the status of the token.

Clause 17. The system of clause 15, wherein the account holding system (108) is further configured to receive the TOK MSG and store the token (TOK) for use in payment transactions.

Clause 18. The system of clause 16, wherein the STE processor (102) is further configured to generate the TOK NOTIFICATION MSG in response to a request from the first computing system (106) or the sponsor computing system (112) for tokenized account information.

Clause 19. The system of clause 16, wherein the additional information included in the TOK NOTIFICATION MSG comprises at least one of a token expiration date, a token usage limit, a tokenization timestamp, or a token status.

Clause 20. The system of clause 15, wherein the token (TOK) generated by the STE processor (102) is effective across different payment networks and different financial institutions, and wherein the financial institutions can be on the same or different payment networks.

Clause 21. A method for tokenization of account information, comprising:

receiving, by a secure token exchange (STE) processor (102), a token request communication message (TR MSG) from an account holding system (108) requesting tokenization of real account information;

tokenizing the real account information and generating a token (TOK) by the STE processor (102);

sending a tokenized electronic communication message (TOK MSG) to the account holding system (108), wherein the TOK MSG includes the token (TOK) and excludes the real account information.

Clause 22. The method of clause 21, further comprising generating a tokenization notification message (TOK NOTIFICATION MSG) by the STE processor (102) and communicating it to the account holding system (108), wherein the TOK NOTIFICATION MSG includes the token (TOK) and additional information regarding the status of the token.

Clause 23. The method of clause 21, further comprising storing the token (TOK) in the account holding system (108) for use in payment transactions.

Clause 24. The method of clause 22, further comprising generating the TOK NOTIFICATION MSG in response to a request from a first computing system (106) or a sponsor computing system (112) for tokenized account information.

Clause 25. The method of clause 22, wherein the additional information included in the TOK NOTIFICATION MSG comprises at least one of a token expiration date, a token usage limit, a tokenization timestamp, or a token status.

Clause 26. The method of clause 21, wherein the token (TOK) generated by the STE processor (102) is effective across different payment networks and different financial institutions, and wherein the financial institutions can be on the same or different payment networks.

Clause 27. A system for in-network token provisioning during a transaction, comprising:

a payment network (110);

an account holding system (108) configured to send a payment transaction message (PT MSG-1) with a payment token request (PRTK) code to the payment network (110);

a STE processor (102) configured to receive a tokenization request message (TOK REQ. MSG-1) from the payment network (110), and to generate a token and return a tokenization response message (TOK RESP. MSG-1) to the payment network (110) with the token information;

a sponsor computing system (112) configured to receive a payment transaction message (PT MSG-2) from the payment network (110) with the token; and a first computing system (106) configured to receive PT MSG-2 from the sponsor computing system (112).

Clause 28. The system of clause 27, wherein in-network provisioning is performed as a result of a request for payment (RfP).

Clause 29. The system of clause 27, wherein an RTP® network performs in-network provisioning by creating the token as part of an RTP® network transaction flow.

Clause 30. The system of clause 27, wherein an RTP® network receives a real-time payment message with an in-network provisioning flag, and makes a call to the STE processor (102) to provision a token or to look up a previously provisioned token.

Clause 31. The system of clause 27, wherein the real-time payment message is tokenized by replacing a participant's RTN and the sender's account number with the participant's token RTN and a token, thereby masking the participant's account information in the outbound real-time payment message to another participant.

Clause 32. A method for in-network token provisioning during a transaction, comprising: receiving a payment transaction message (PT MSG-1) with a payment token request (PRTK) code from an account holding system (108);

sending a tokenization request message (TOK REQ. MSG-1) to a STE processor (102);

generating a token and returning a tokenization response message (TOK RESP. MSG-1) to the payment network (110) with the token information;

receiving a payment transaction message (PT MSG-2) from a sponsor computing system (112) with the token; and sending PT MSG-2 to a first computing system (106).

Clause 33. The method of clause 32, wherein the in-network provisioning is performed as a result of a request for payment (RfP).

Clause 34. The method of clause 32, wherein the in-network provisioning is performed by an RTP® network creating the token as part of an RTP® network transaction flow.

Clause 35. The method of clause 32, wherein the RTP® network receives a real-time payment message with an in-network provisioning flag, and makes a call to the STE processor (102) to provision a token or to look up a previously provisioned token.

Clause 36. The method of clause 32, wherein the real-time payment message is tokenized by replacing a participant's RTN and the sender's account number with the participant's token RTN and a token, thereby masking the participant's account information in the outbound real-time payment message to another participant.

Clause 37. A system for providing a tokenized credit transfer in an RTP® network, comprising:

a first computing system (106) configured to communicate a first payment transaction message (PT MSG-1) containing a token (TOK) to a sponsor computing system (112);

sponsor computing system (112) configured to forward the PT MSG-1 message to a payment network (110), which is an RTP® network;

a payment network (110) configured to receive PT MSG-1, detect the token within the message, and communicate a detokenization request message (DETOK REQ. MSG-1) to an STE processor (102);

STE processor (102) configured to retrieve real account information from an STE vault (104) by mapping the token in the DETOK REQ. MSG-1 to the real account information stored in the STE vault 104, and forward a detokenization response message (DETOK RESP. MSG-1) to the payment network (110); and the payment network (110) configured to receive the DETOK RESP. MSG-1 from the STE processor (102) and communicate a second payment transaction message (PT MSG-2) containing real account information to an account holding system (108).

Clause 38. The system of clause 37, wherein the payment network (110) detects the token within the PT MSG-1 message by detecting a tokenized routing transit number in a field of the message packet.

Clause 39. The system of clause 37, wherein the STE processor (102) retrieves the real account information from the STE vault (104) by using a unique identifier to find a first table that contains the record, obtaining a surrogate key for the record, and using the surrogate key to find corresponding second tables that contain additional details about the record.

Clause 40. The system of clause 37, wherein the STE vault (104) stores the real account information associated with a particular business entity in second tables, each of which contains a subset of the data, and joins the second tables with the first table using a link table to retrieve the complete record.

Clause 41. A method for providing a tokenized credit transfer in an RTP® network, comprising:

communicating a first payment transaction message (PT MSG-1) containing a token (TOK) from a first computing system (106) to a sponsor computing system (112);

forwarding the PT MSG-1 message from the sponsor computing system (112) to a payment network (110), which is an RTP® network;

receiving the PT MSG-1 message by the payment network (110), detecting the token within the message, and communicating a detokenization request message (DETOK REQ. MSG-1) to an STE processor (102);

retrieving real account information from an STE vault (104) by the STE processor (102) by mapping the token in the DETOK REQ. MSG-1 to the real account information stored in the STE vault 104, and forwarding a detokenization response message (DETOK RESP. MSG-1) to the payment network (110); and receiving the DETOK RESP. MSG-1 from the STE processor (102) by the payment network (110) and communicating a second payment transaction message (PT MSG-2) containing real account information to an account holding system (108).

Clause 42. The method of clause 41, wherein detecting the token within the PT MSG-1 message is performed by detecting a tokenized routing transit number in a field of the message packet.

Clause 43. The method of clause 41, wherein retrieving the real account information from the STE vault (104) is performed by using a unique identifier to find a first table that contains the record, obtaining a surrogate key for the record, and using the surrogate key to find corresponding second tables that contain additional details about the record.

Clause 44. The method of clause 41, wherein storing the real account information associated with a particular business entity in the STE vault (104) is performed by storing the information in second tables, each of which contains a subset of the data, and joining the second tables with the first table using a link table to retrieve the complete record.

Clause 45. A system for providing tokenized credit or debit transfer in an ACH network, comprising:

a first computing system (106) configured to communicate a first payment transaction message (PT MSG-1) containing a token (TOK) to be detokenized;

a sponsor computing system (112) configured to receive the PT MSG-1 message from the first computing system (106) and forward it to a payment network (110);

a payment network (110) configured to receive the PT MSG-1 message containing a token and communicate a detokenization request message (DETOK REQ. MSG-1)

to a STE processor (102) to retrieve real account information by mapping the token in the DETOK REQ. MSG-1 to real account information stored in a STE vault (104);

the STE processor (102) configured to use the DETOK REQ. MSG-1 to retrieve the real account information and return a detokenization response message (DETOK RESP. MSG-1) to the payment network (110); and an account holding system (108) configured to receive a second payment transaction message (PT MSG-2) that includes real account information from the payment network (110) to effect the ACH transaction.

Clause 46. The system of clause 45, wherein a table containing mappings of real account information and tokens is stored in the STE vault (104) and retrieved periodically by the STE processor (102) to push updates to the payment network (110).

Clause 47. The system of clause 45, wherein a table containing mappings of real account information and tokens is generated by the STE vault (104) and pulled by the STE processor (102) when needed.

Clause 48. The system of clause 45, wherein payment network (110) requests the table from STE processor (102) periodically by communicating a message requesting the table (PULL MSG-1).

Clause 49. The system of clause 45, the payment network (110) or the STE processor (102) further configured to perform a validation operation to determine whether a credit transaction or debit transaction is permitted for a particular account and the determination is performed against the token.

Clause 50. A method for providing tokenized credit or debit transfer in an ACH network, comprising:

communicating a first payment transaction message (PT MSG-1) containing a token (TOK) to be detokenized from a first computing system (106) to a sponsor computing system (112);

forwarding the PT MSG-1 message from the sponsor computing system (112) to a payment network (110);

receiving the PT MSG-1 message containing a token in the payment network (110) and communicating a detokenization request message (DETOK REQ. MSG-1) to a STE processor (102) to retrieve real account information by mapping the token in the DETOK REQ. MSG-1 to real account information stored in a STE vault (104);

using the DETOK REQ. MSG-1 to retrieve the real account information in the STE processor (102) and returning a detokenization response message (DETOK RESP. MSG-1) to the payment network (110); and receiving a second payment transaction message (PT MSG-2) that includes real account information from the payment network (110) in an account holding system (108) to effect the ACH transaction.

Clause 51. The method of clause 50, further comprising periodically storing mappings of real account information and tokens in a table in the STE vault (104) and retrieving the table periodically by the STE processor (102) to push updates to the payment network (110).

Clause 52. The method of clause 50, further comprising generating mappings of real account information and tokens by the STE vault (104) and pulling the table by the STE processor (102) when needed.

Clause 53. The method of clause 50, further comprising periodically requesting the table from the STE processor (102) by the payment network (110) by communicating a message requesting the table (PULL MSG-1).

Clause 54. The method of clause 50, further comprising performing a validation operation by the payment network (110) or the STE processor (102) to determine whether a credit transaction or debit transaction is permitted for a particular account and the determination is performed against the token.

Clause 55. A system for providing requests for payment (RfP) and subsequent credit transfers, comprising:

a first computing system (106) configured to issue a first RfP message (RfP MSG-1) containing a token;

a sponsor computing system (112) configured to forward the first RfP message to a payment network (110);

the payment network (110) configured to issue a detokenization request (DETOK REQ.) to a secure token exchange (STE) processor (102) to retrieve detokenized data (DETOK RESP.) corresponding to an account associated with the RfP message, and to transmit a second RfP message (RfP MSG-2) including the detokenized account information and any additional payment information necessary to effect payment;

an account holding system (108) configured to execute the credit transfer upon receiving the second RfP message; and the payment network (110) further configured to communicate the real account information in a payment transaction message (PT MSG-1) to the STE processor (102) to retokenize the token, and to forward a second PT MSG (PT MSG-2) including the retokenized information to the first computing system (106).

Clause 56. The system of clause 55, wherein the payment network is the RTP® network.

Clause 57. The system of clause 55, wherein the STE processor (102) is configured to generate pre-approval information to be included with the token, where the pre-approval information is configured to be recognized by the account holding system (108).

Clause 58. The system of clause 55, wherein the DETOK RESP. is from the STE processor (102) includes the pre-approval information.

Clause 59. The system of clause 55, wherein the payment network (110) receives in the first PT MSG from the account holding system an indication that the credit transfer to the sponsor computing system has been pre-approved.

Clause 60. The system of clause 55, wherein the payment network (110) determines whether to proceed with a transaction.

Clause 61. The system of clause 55, wherein the payment network (110) is configured to use PACS.008 formatted messages for communicating credit pushes and PAIN.013 formatted messages for communicating RfP messages.

Clause 62. A method for providing requests for payment (RfP) and subsequent credit transfers, comprising:

issuing a first RfP message (RfP MSG-1) containing a token from a first computing system (106);

forwarding the first RfP message to a payment network (110) from a sponsor computing system (112);

issuing a detokenization request (DETOK REQ.) from the payment network (110) to a secure token exchange (STE) processor (102) to retrieve detokenized data (DETOK RESP.) corresponding to an account associated with the RfP message;

transmitting a second RfP message (RfP MSG-2) including the detokenized account information and any additional payment information necessary to effect payment from the payment network (110);

executing the credit transfer upon receiving the second RfP message from an account holding system (108);

communicating the real account information in a payment transaction message (PT MSG-1) to the STE processor (102) to retokenize the token from the payment network (110); and forwarding a second PT MSG (PT MSG-2) including the retokenized information to the first computing system (106) from the payment network (110).

Clause 63. The method of clause 62, wherein the payment network is the RTP® network clause 64. The method of clause 62, wherein the STE processor (102) generates pre-approval information to be included with the token, where the pre-approval information is recognized by the account holding system (108).

Clause 65. The method of clause 64, wherein the DETOK RESP. from the STE processor (102) includes the pre-approval information.

Clause 66. The method of clause 62, wherein the payment network (110) receives in the first PT MSG from the account holding system an indication that the credit transfer to the sponsor computing system has been pre-approved.

Clause 67. The method of clause 62, wherein the payment network (110) determines whether to proceed with a transaction.

Clause 68. The method of clause 62, wherein the payment network (110) uses PACS.008 formatted messages for communicating credit pushes and PAIN.013 formatted messages for communicating RfP messages.

Clause 69. A system for enhanced data aggregation security comprising:

a data aggregator (652);

a data access network (654);

a STE processor (102), including an STE vault (104), communicatively coupled to the data access network (654);

an account holding system (658) communicatively coupled to the data access network (654) and a graphical user interface (660);

wherein the data aggregator (652) requests consumer data through the data access network (654), and the data access network (654) performs a consumer verification operation by requesting data from the account holding system (658), and the account holding system (658) communicates DDA information and relevant data to the data access network (654), and the data access network (654) performs a tokenization request operation by communicating a tokenization request message (DDA TR) including the DDA information to the STE processor, and the STE processor (102) tokenizes the DDA information and passes back the token (TOK) to the data access network (654), which forwards the token and data to the data aggregator (652).

Clause 70. The system of clause 69, wherein the account holding system (658) communicates consumer verification information directly to the STE processor (102), and the STE processor (102) provides a token in response, which is passed by the data access network (654) to the data aggregator.

Clause 71. The system of clause 69, wherein the data access network (654) operates as a relay between the STE processor (102) and the data aggregator (652) does not store the DDA information or the consumer verification information.

Clause 72. A method for enhanced data aggregation security, comprising:

receiving a request for consumer data from a data aggregator (652) through a data access network (654);

performing a consumer verification operation by requesting consumer verification information from an account holding system (658) through the data access network (654);

communicating the consumer verification information and DDA information to the data access network (654);

performing a tokenization request operation by communicating a tokenization request message (DDA TR) including the DDA information to an STE processor (102) communicatively coupled to the data access network (654);

tokenizing the DDA information by the STE processor (102) and passing back a token (TOK) to the data access network (654); and forwarding the token and consumer data to the data aggregator (652) by the data access network (654).

Clause 73. The method of clause 72, wherein the consumer verification information is communicated directly to the STE processor (102) from the account holding system (658), and the STE processor (102) provides a token in response, which is passed by the data access network (654) to the data aggregator (652).

Clause 74. The method of clause 72, wherein the data access network (654) operates as a relay between the STE processor (102) and the data aggregator (652) and does not store the DDA information or the consumer verification information.

Clause 75. A non-transitory computer-readable medium having stored thereon sequences of instructions, the sequences of instructions including instructions which when executed by a computer system causes the computer system to perform any of the methods in Clauses 1-74.

What is claimed is:

1. A system for tokenizing account information, comprising:
  a first computing system (106) configured to communicate a token request communication message (TR MSG) to a secure token exchange (STE) processor (102), the TR MSG including real account information of an account managed by an account holding system (108);
  a secure token exchange vault (104) configured to store rules and information associated with the account;
  the STE processor (102) configured to:
    receive the TR MSG from the first computing system (106),
    access the secure token exchange vault (104) and verify the token request against the stored rules,
    validate tokens against the stored rules to prevent unauthorized use,
    determine whether tokens associated with accounts are enabled on both an ACH network and an RTP network by performing eligibility checks that verify routing numbers are eligible on both the ACH network and the RTP network,
    obtain a token (TOK) that includes tokenized real account information formatted for interoperable use across different payment networks including both the ACH network and the RTP network and different financial institutions, wherein the tokenized real account information:
      corresponds to the real account information of the account identified by the first computing system (106) in the TR MSG, and
      has a data structure that replicates a structure of the real account information of the account without including the real account information, thereby enabling processing by payment networks including the ACH network and the RTP network while maintaining format compatibility across different network protocols; and
    the STE processor (102) further configured to communicate a tokenized electronic communication message (TOK MSG) to the first computing system (106), the TOK MSG including the token (TOK) without including the real account information of the account.

2. The system of claim 1, wherein the real account information of the account resides in the account holding system (108).

3. The system of claim 1, wherein the real account information of the account resides in the first computing system (106).

4. A method for tokenizing account information, comprising:
  receiving a token request communication message (TR MSG) from a first computing system (106), the TR MSG including real account information of an account managed by an account holding system (108);
  accessing a secure token exchange vault (104) and verifying the token request against stored rules;
  validating one or more tokens against the stored rules to prevent unauthorized use;

determining whether tokens associated with accounts are enabled on both an ACH network and an RTP network by performing eligibility checks that verify routing numbers are eligible on both the ACH network and the RTP network,
obtaining a token (TOK) that includes tokenized real account information formatted for interoperable use across different payment networks including both the ACH network and the RTP network, wherein the tokenized real account information corresponds to the real account information of the account identified by the first computing system (106) in the TR MSG and has a data structure that replicates a structure of the real account information of the account without including the real account information, thereby enabling processing by payment networks including the ACH network and the RTP network while maintaining format compatibility across different network protocols; and
communicating a tokenized electronic communication message (TOK MSG) to the first computing system (106), the TOK MSG including the token (TOK) without including the real account information of the account.

5. The method of claim 4, wherein the real account information of the account resides in the account holding system (108).

6. The method of claim 4, wherein the real account information of the account resides in the first computing system (106).

7. A system for tokenization of account information, comprising:
  a sponsor computing system (112) configured to communicate a request message including account information to a secure token exchange (STE) processor (102) for tokenization;
  the STE processor (102), configured to:
    receive the request message from the sponsor computing system (112),
    access a secure token exchange vault (104) and verify the token request against the stored rules,
    validate tokens against stored rules to prevent unauthorized use,
    determine whether tokens associated with accounts are enabled on both an ACH network and an RTP network by performing eligibility checks that verify routing numbers are eligible on both the ACH network and the RTP network,
    generate a token (TOK) that includes tokenized account information formatted for interoperable use across different payment networks including both the ACH network and the RTP network and different financial institutions, wherein the tokenized account information:
      corresponds to the real account information of the account identified in the request message, and
      has a data structure that replicates a structure of the real account information of the account without including the real account information, thereby enabling processing by payment networks including the ACH network and the RTP network while maintaining format compatibility across different network protocols, and
    communicate the token (TOK) to the sponsor computing system (112) without including the real account information of the account; and
  a first computing system (106) in communication with the sponsor computing system (112) and configured to receive the tokenized account information from the sponsor computing system (112) for use in a payment transaction; wherein the sponsor computing system (112) is configured to forward the tokenized electronic communication message (TOK MSG) to the first computing system (106) without including the real account information of the account.

8. The system of claim 7, wherein the token (TOK) generated by the STE processor (102) is effective across different payment networks and different financial institutions, and wherein the financial institutions are on the same or different payment networks.

9. The system of claim 7, wherein the real account information of the account resides in the sponsor computing system (112) for a predetermined amount of time prior to tokenization, and further wherein the real account information also resides in the first computing system (106) or an account holding system (108).

10. A method for tokenizing account information, comprising:

receiving a request message including account information from a sponsor computing system;

accessing a secure token exchange vault (104) and verifying the token request against the stored rules, validating tokens against stored rules to prevent unauthorized use, determining whether tokens associated with accounts are enabled on both an ACH network and an RTP network by performing eligibility checks that verify routing numbers are eligible on both the ACH network and the RTP network, generating a token (TOK) that includes tokenized account information formatted for interoperable use across different payment networks including both the ACH network and the RTP network and different financial institutions, wherein the tokenized account information:

corresponds to the real account information of the account identified in the request message, and has a data structure that replicates a structure of the real account information of the account without including the real account information, thereby enabling processing by payment networks including the ACH network and the RTP network while maintaining format compatibility across different network protocols;

communicating the token (TOK) to the sponsor computing system without including the real account information of the account; and forwarding the tokenized electronic communication message (TOK MSG) to a first computing system without including the real account information of the account.

11. The method of claim 10, wherein the token (TOK) generated by the STE processor is effective across different payment networks and different financial institutions, and wherein the financial institutions are on the same or different payment networks.

12. The method of claim 10, wherein the real account information of the account resides in the sponsor computing system for a predetermined amount of time prior to tokenization, and further wherein the real account information also resides in the first computing system or an account holding system.

13. A system for tokenization of account information, comprising:

a secure token exchange (STE) processor (102) configured to:

receive a token request communication message (TR MSG) from an account holding system (108) requesting tokenization of real account information, access the secure token exchange vault (104) that store rules and information associated with accounts and verify the token request against the stored rules, validate tokens against the stored rules to prevent unauthorized use, determine whether tokens associated with accounts are enabled on both an ACH network and an RTP network by performing eligibility checks that verify routing numbers are eligible on both the ACH network and the RTP network, tokenize the real account information and generate a token (TOK) that includes tokenized account information formatted for use across different payment networks including both the ACH network and the RTP network and different financial institutions, wherein the tokenized account information:

corresponds to the real account information identified in the TR MSG, and has a data structure that replicates a structure of the real account information of the account without including the real account information, thereby enabling processing by payment networks including the ACH network and the RTP network while maintaining format compatibility across different network protocols, and send a tokenized electronic communication message (TOK MSG) to the account holding system (108), wherein the TOK MSG includes the token (TOK) and excludes the real account information.

14. The system of claim 13, wherein the STE processor (102) is further configured to communicate to the account holding system (108) a tokenization notification message (TOK NOTIFICATION MSG) that includes the token (TOK) and additional information regarding the status of the token.

15. The system of claim 14, wherein the STE processor (102) is further configured to generate the TOK NOTIFICATION MSG upon receiving a request from the first computing system (106) or the sponsor computing system (112) for tokenized account information.

16. The system of claim 14, wherein the additional information included in the TOK NOTIFICATION MSG comprises at least one of a token expiration date, a token usage limit, a tokenization timestamp, or a token status.

17. The system of claim 13, wherein the account holding system (108) is further configured to receive the TOK MSG and store the token (TOK) for use in payment transactions.

18. The system of claim 13, wherein the token (TOK) generated by the STE processor (102) is effective across different payment networks and different financial institutions, and wherein the financial institutions are on the same or different payment networks.

19. A method for tokenization of account information, comprising:

receiving, by a secure token exchange (STE) processor (102), a token request communication message (TR MSG) from an account holding system (108) requesting tokenization of real account information;

accessing a secure token exchange vault (104) that store rules and information associated with accounts and verifying the token request against stored rules;

validating tokens against the stored rules to prevent unauthorized use;

determining whether tokens associated with accounts are enabled on both an ACH network and an RTP network by performing eligibility checks that verify routing numbers are eligible on both the ACH network and the RTP network;

tokenizing the real account information and generating a token (TOK) by the STE processor (102) that includes tokenized account information formatted for use across different payment networks including both the ACH network and the RTP network and different financial institutions, wherein the tokenized account information:

corresponds to the real account information identified in the TR MSG, and has a data structure that replicates a structure of the real account information of the account without including the real account information, thereby enabling processing by payment networks including the ACH network and the RTP network while maintaining format compatibility across different network protocols;

sending a tokenized electronic communication message (TOK MSG) to the account holding system (108), wherein the TOK MSG includes the token (TOK) and excludes the real account information.

20. The method of claim 19, further comprising generating a tokenization notification message (TOK NOTIFICATION MSG) by the STE processor (102) and communicating it to the account holding system (108), wherein the TOK NOTIFICATION MSG includes the token (TOK) and additional information regarding the status of the token.

21. The method of claim 20, further comprising generating the TOK NOTIFICATION MSG upon receiving a request from a first computing system (106) or a sponsor computing system (112) for tokenized account information.

22. The method of claim 20, wherein the additional information included in the TOK NOTIFICATION MSG comprises at least one of a token expiration date, a token usage limit, a tokenization timestamp, or a token status.

23. The method of claim 19, further comprising storing the token (TOK) in the account holding system (108) for use in payment transactions.

24. The method of claim 19, wherein the token (TOK) generated by the STE processor (102) is effective across different payment networks and different financial institutions, and wherein the financial institutions are on the same or different payment networks.

* * * * *